Jan. 5, 1960

G. C. ELLERBECK
CALCULATING MACHINE 2,919,852

Filed Sept. 4, 1956

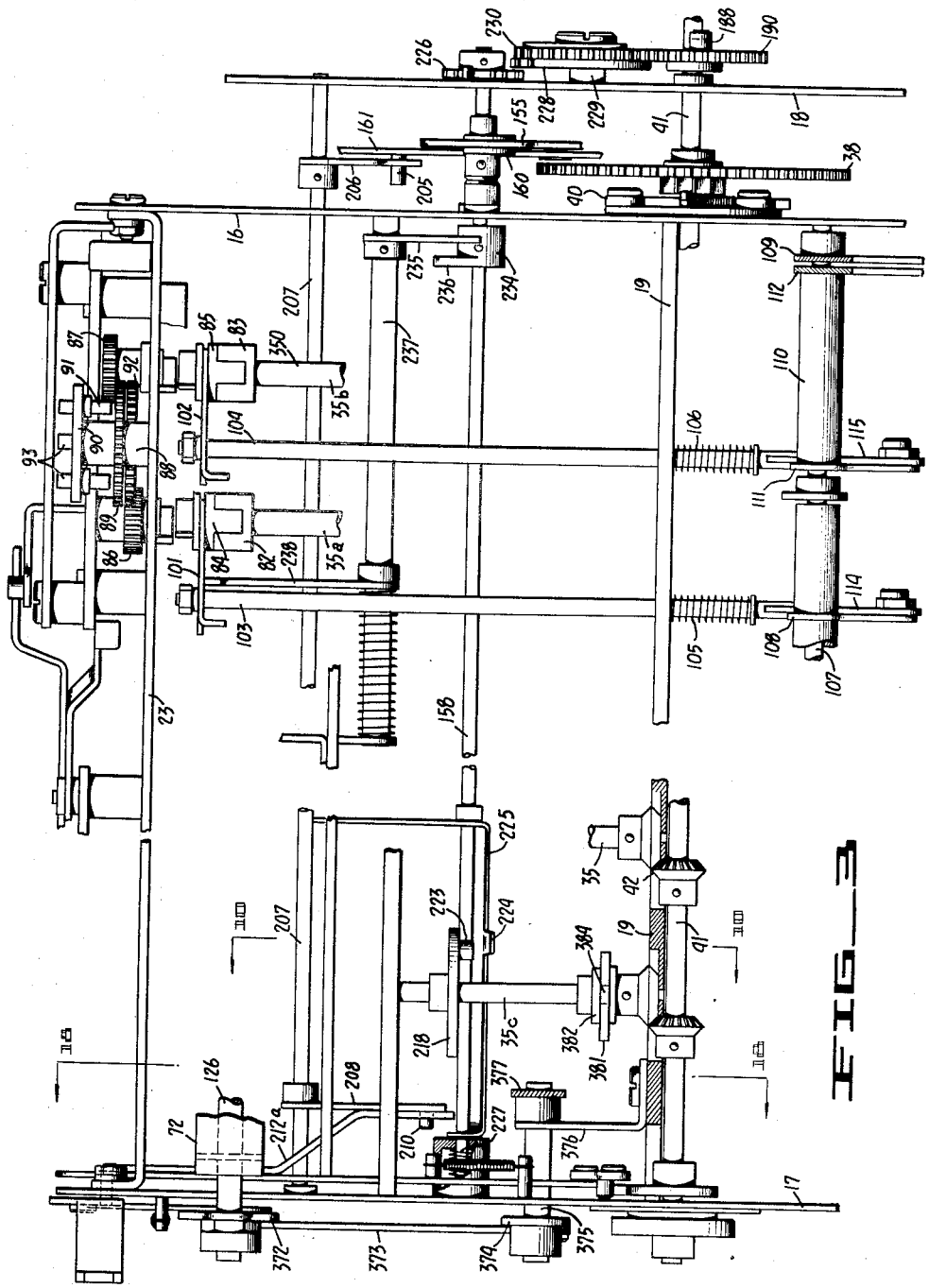

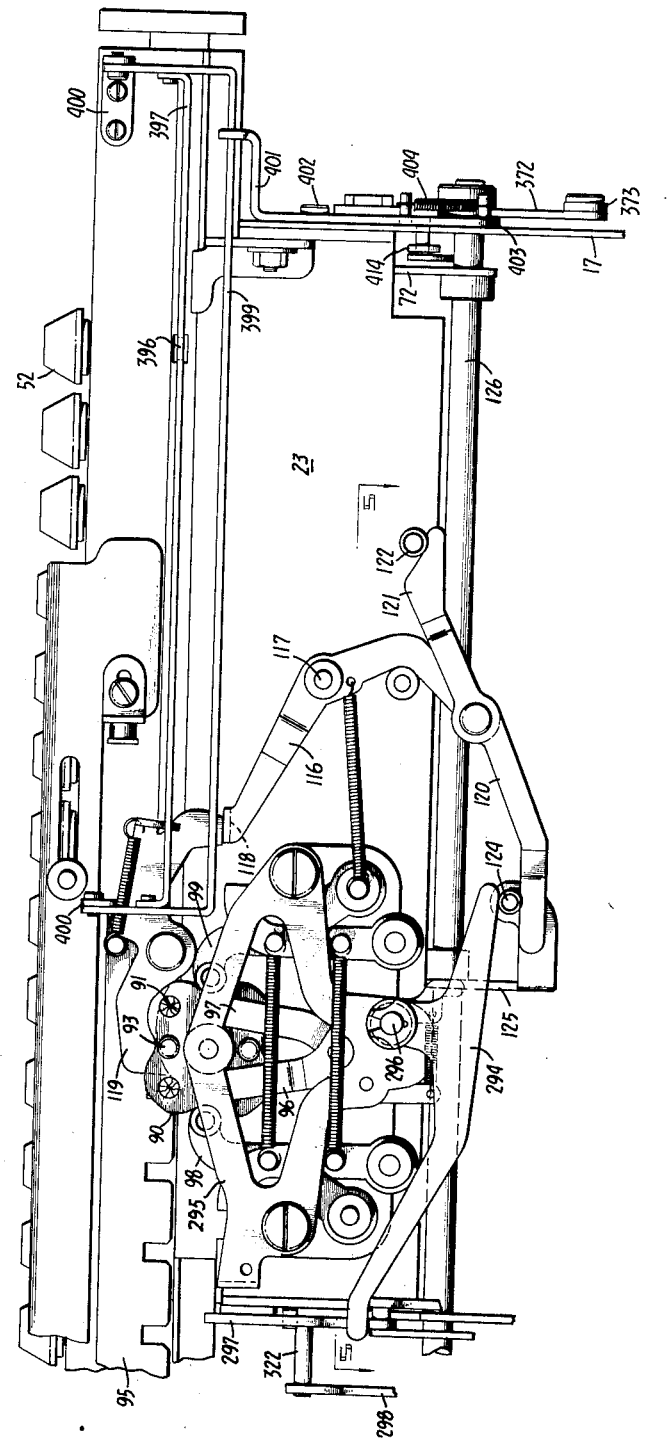

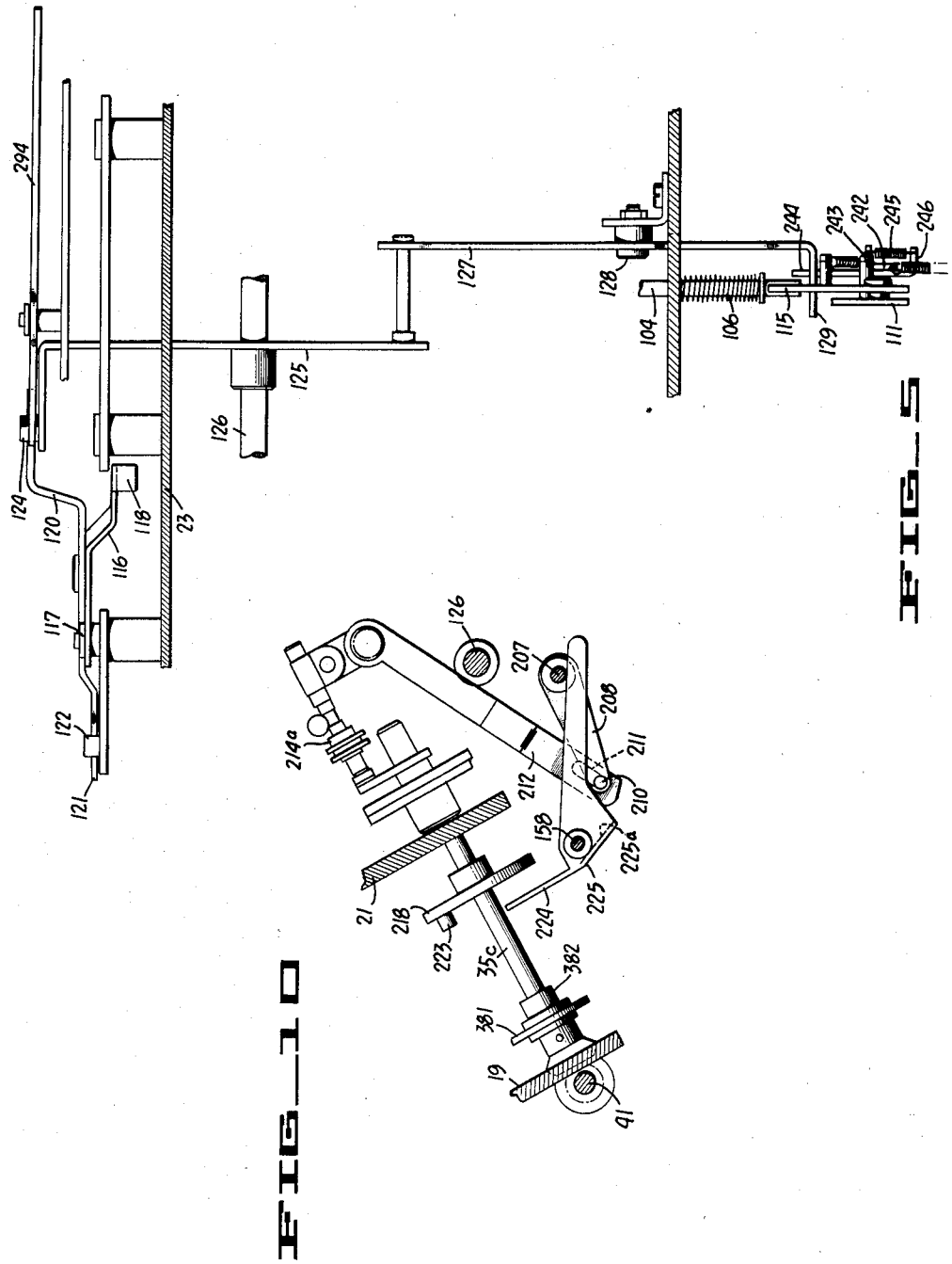

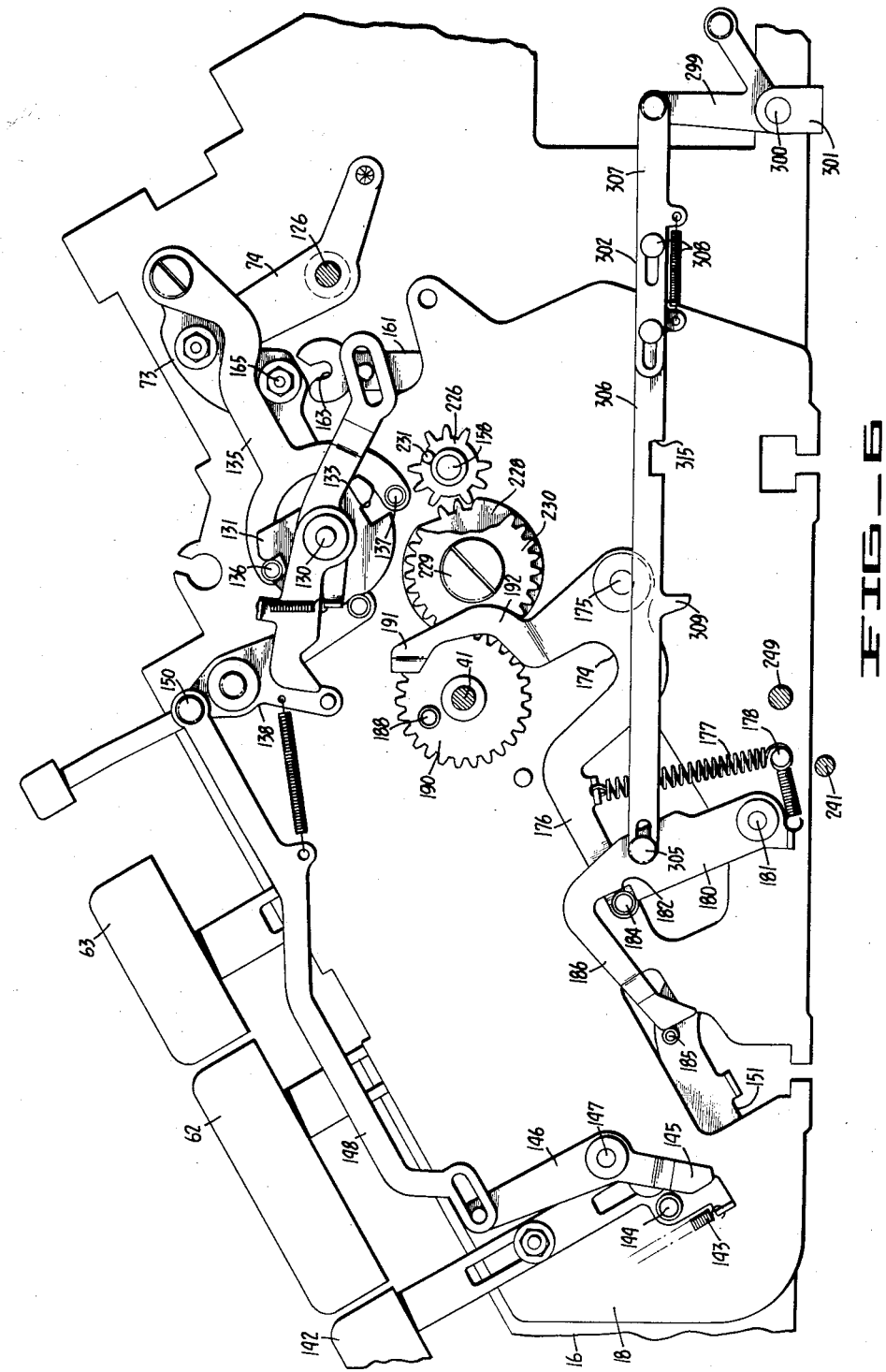

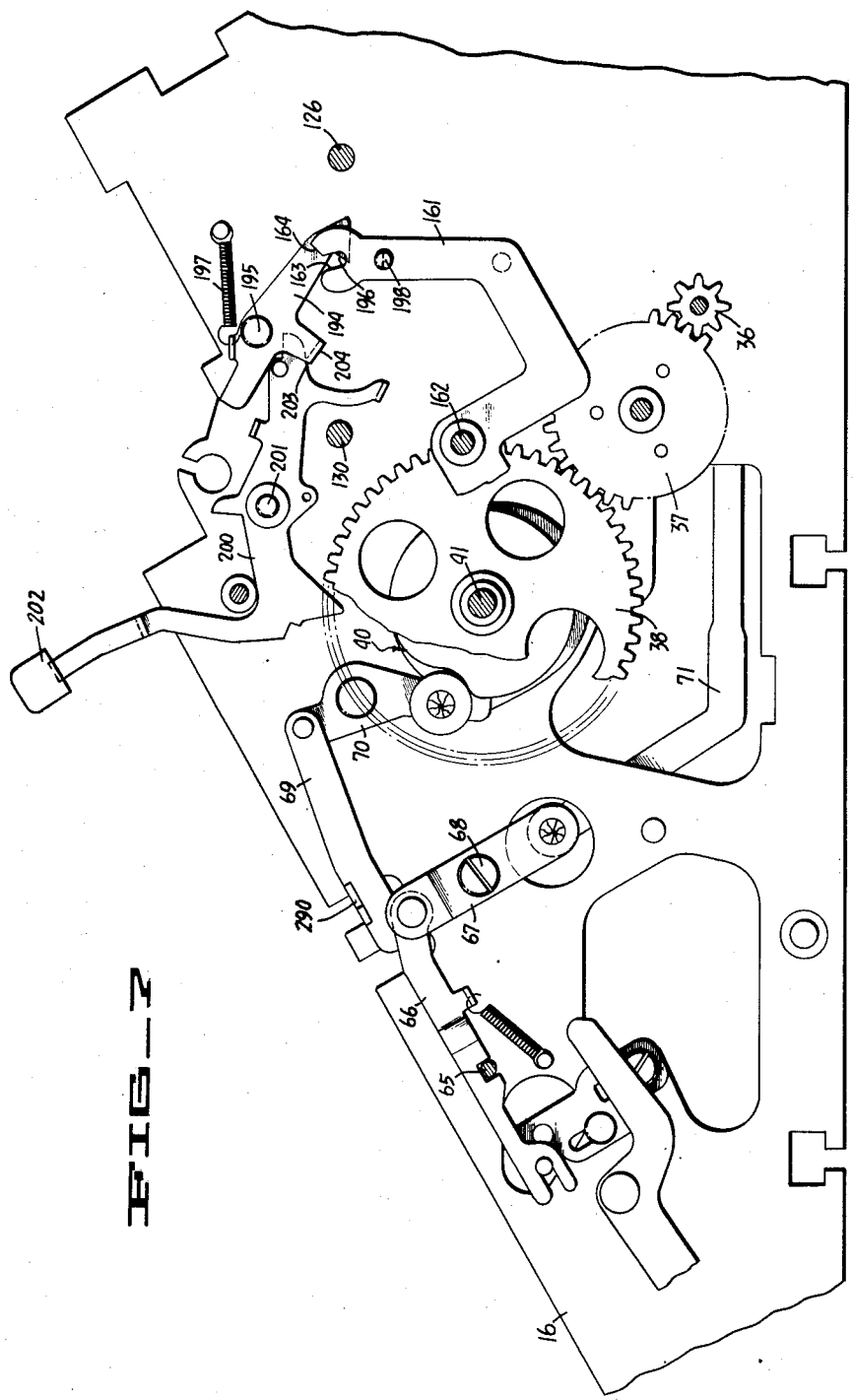

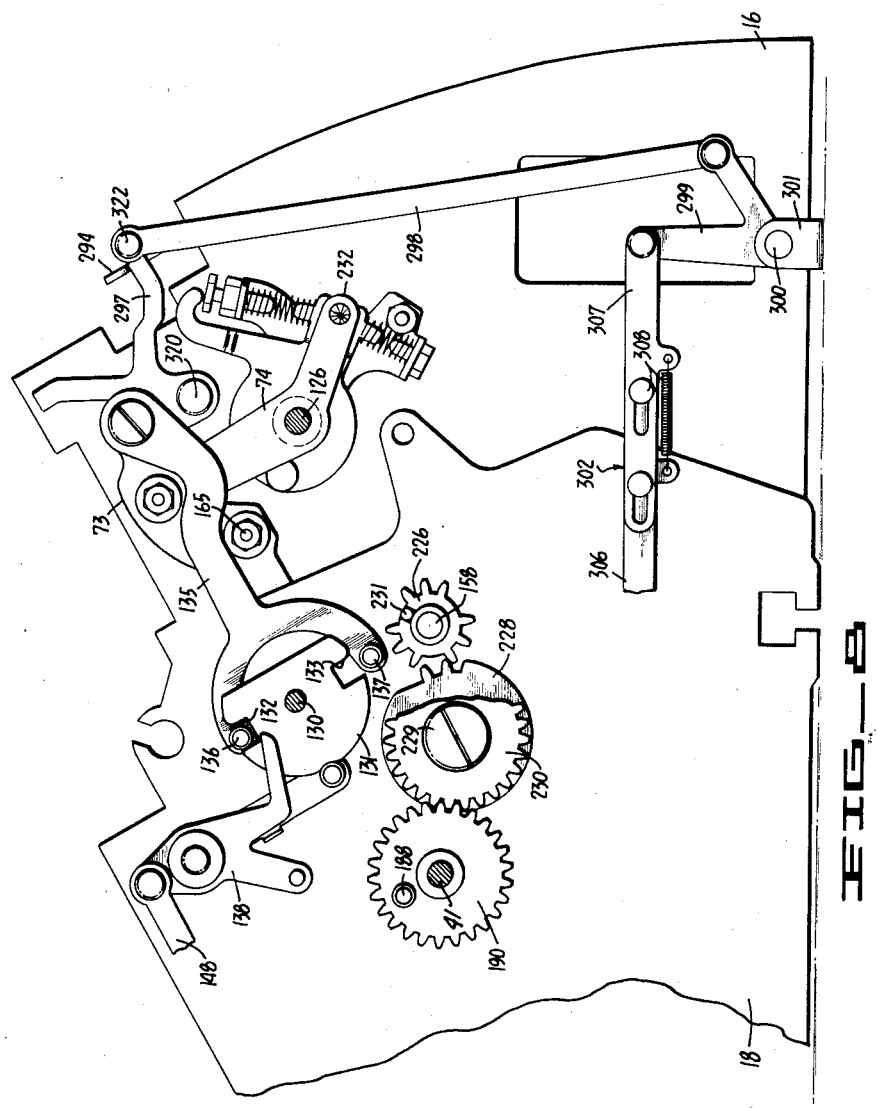

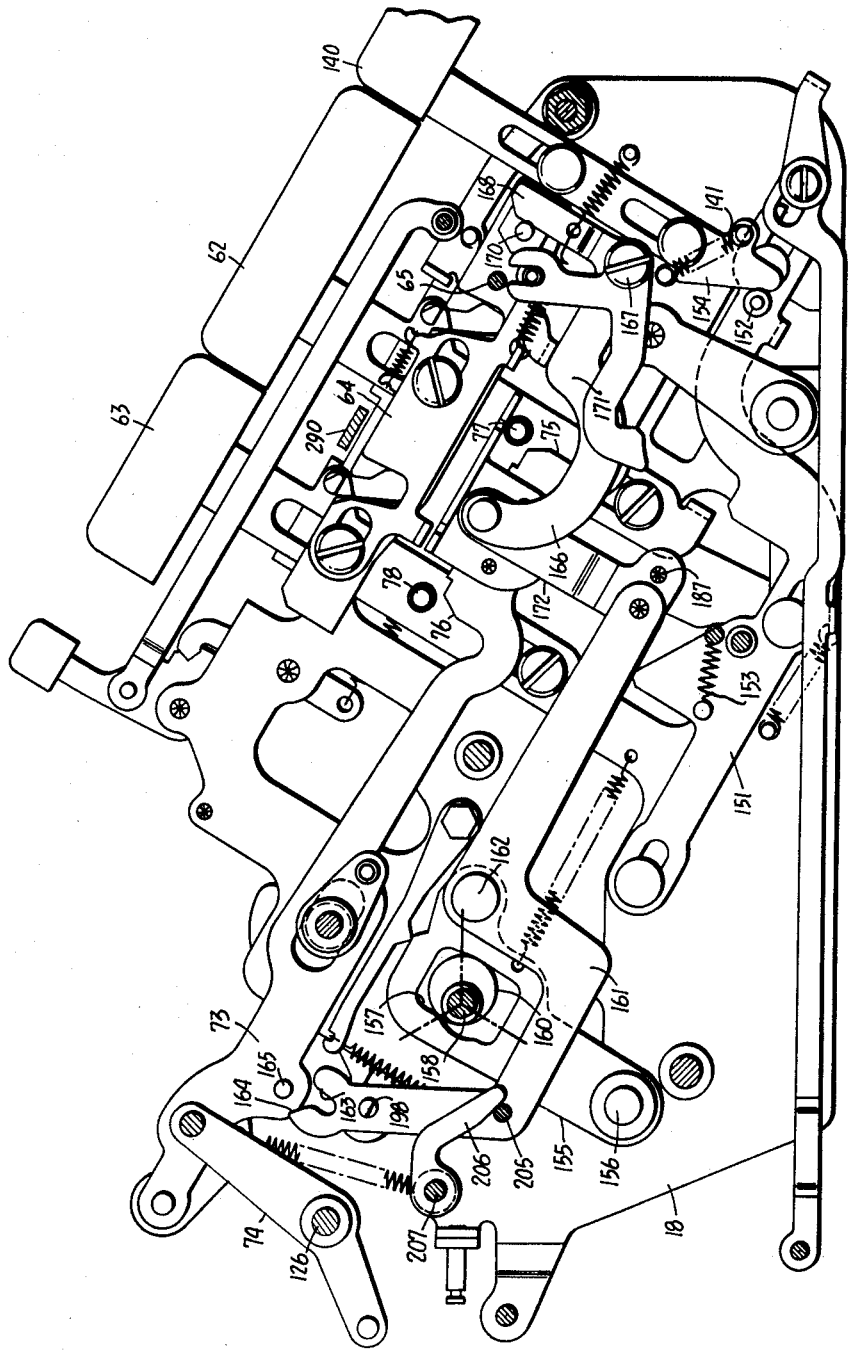

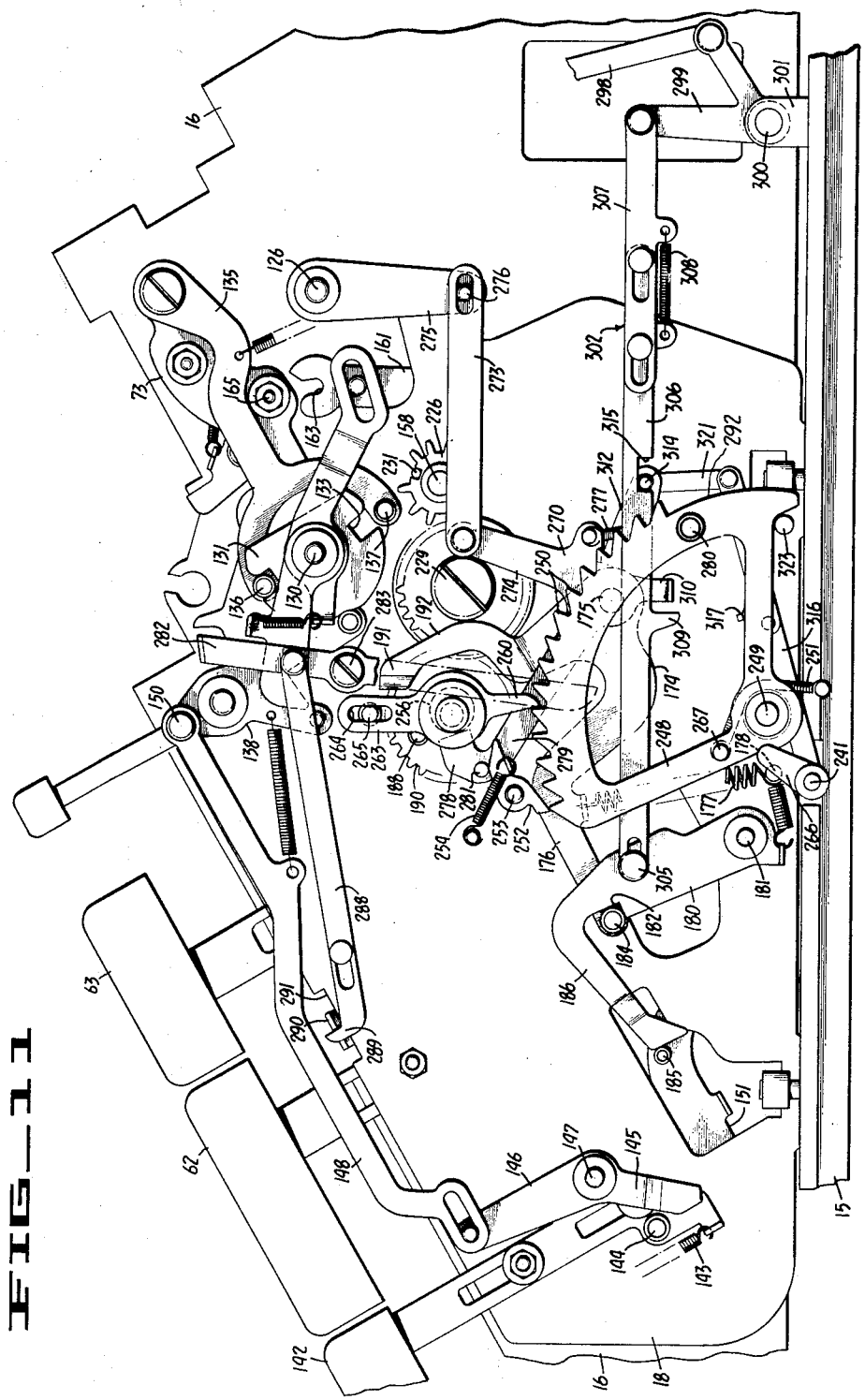
FIG_11

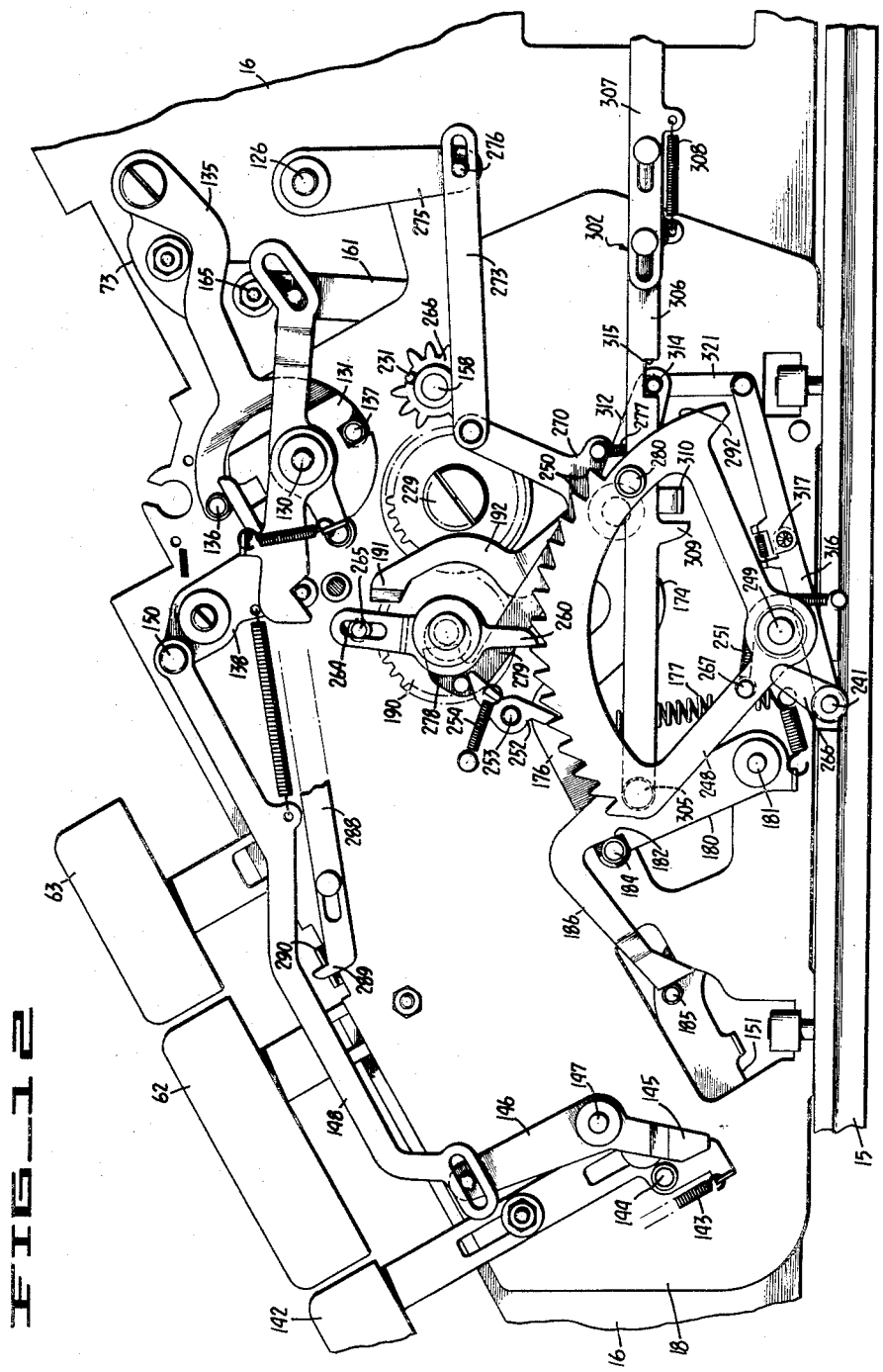

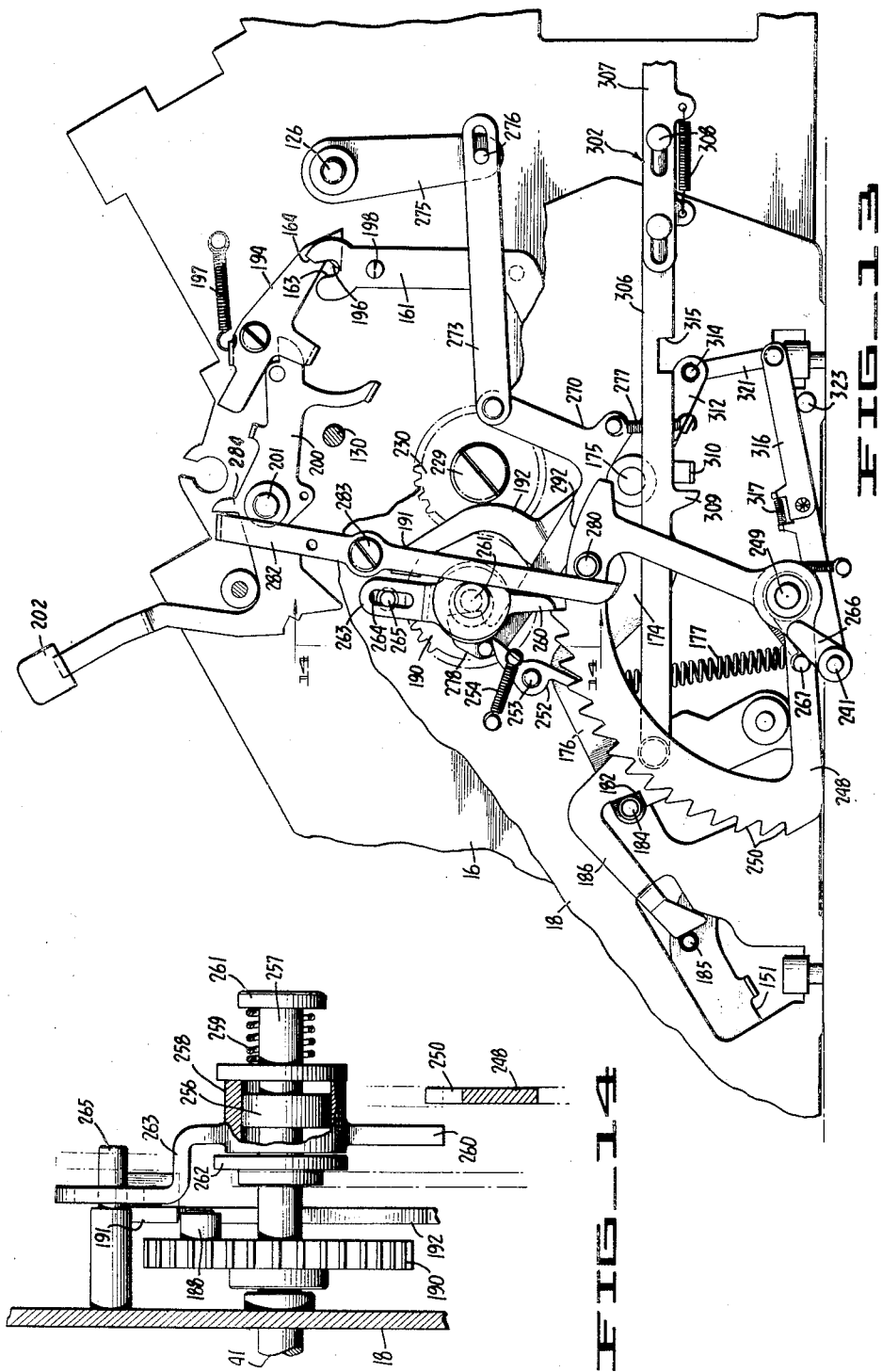

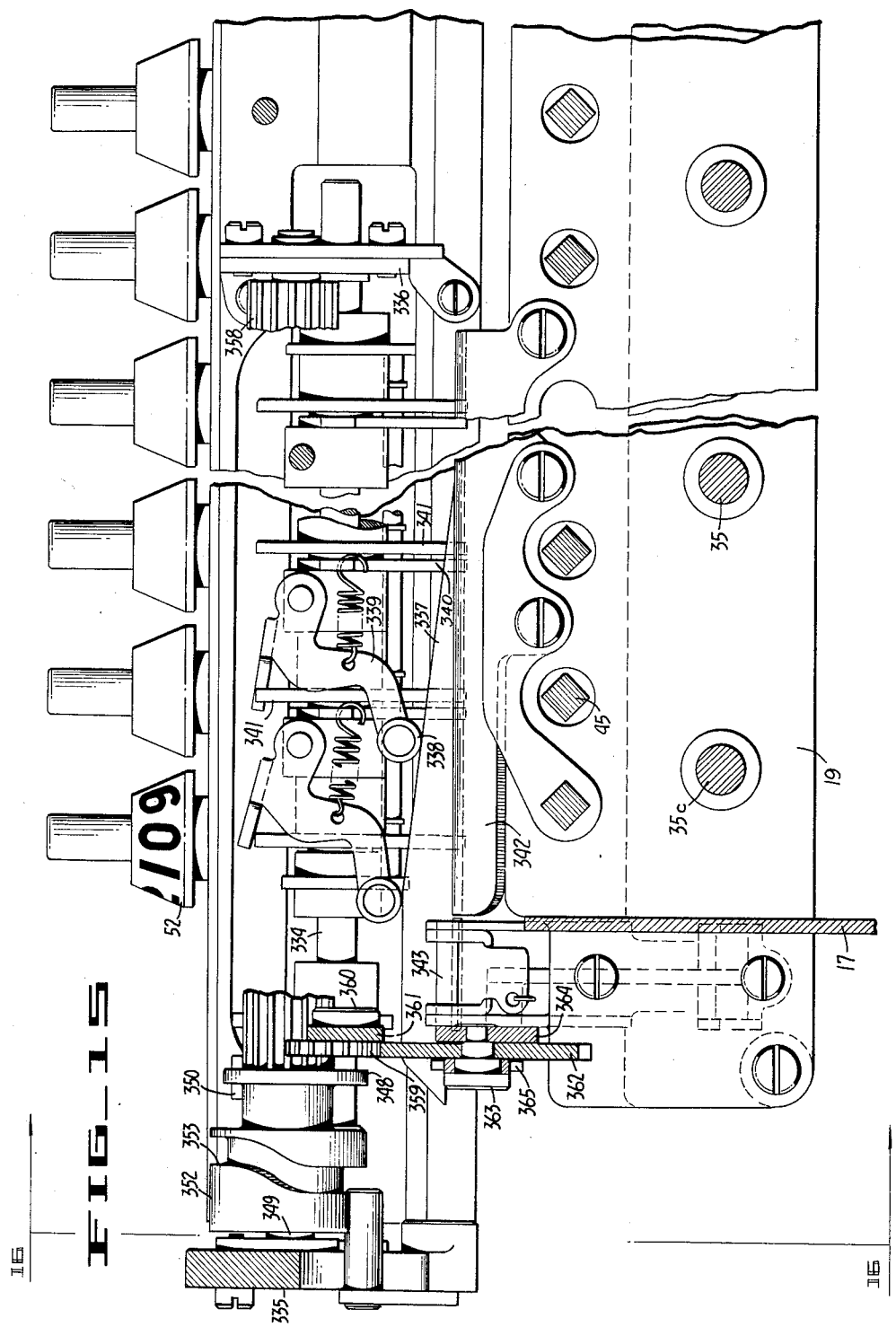

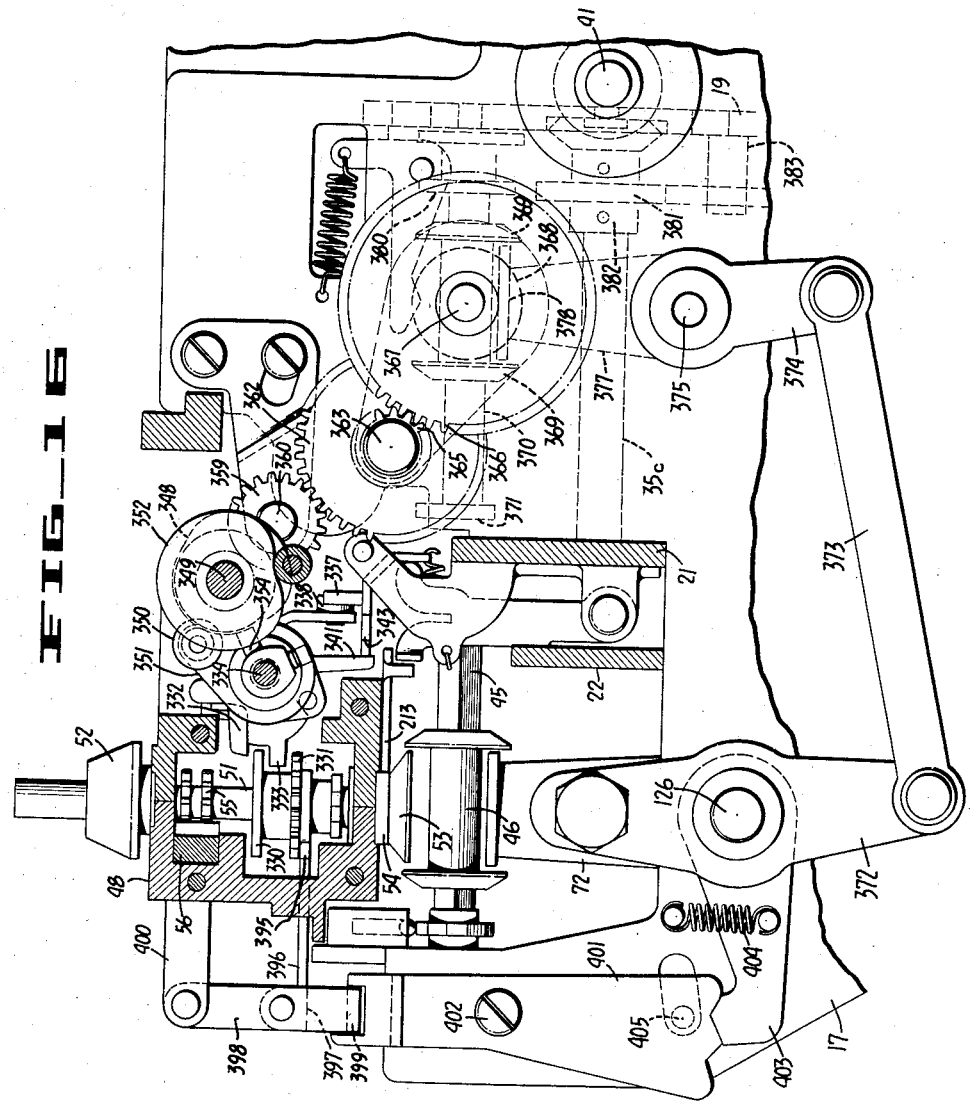

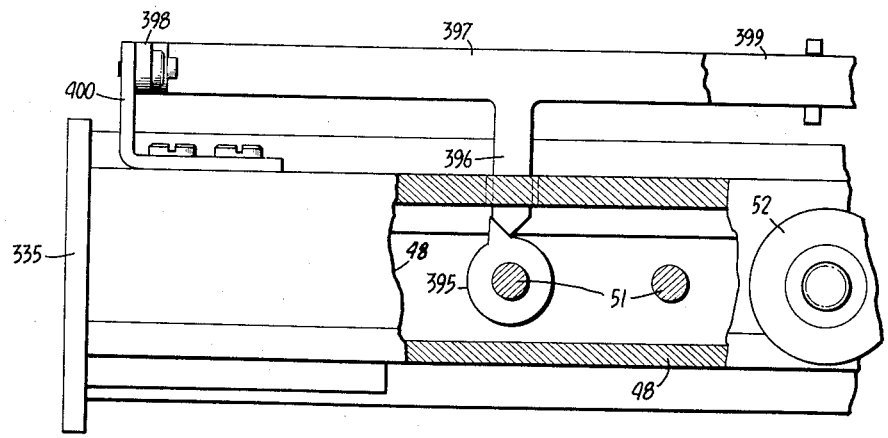
FIG_17
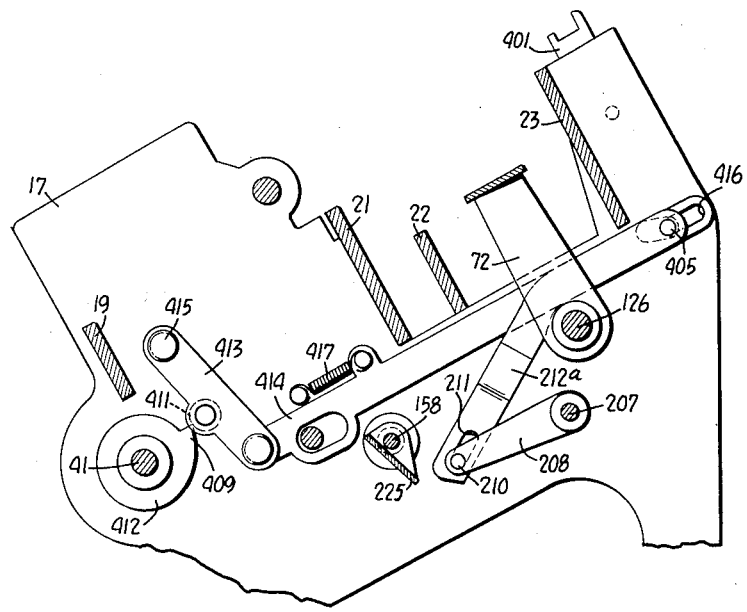
FIG_18

United States Patent Office 2,919,852
Patented Jan. 5, 1960

2,919,852
CALCULATING MACHINE

Grant C. Ellerbeck, San Leandro, Calif., assignor to Friden, Inc., a corporation of California Application September 4, 1956, Serial No. 607,751

16 Claims. (Cl. 235—63)

This invention relates to automatic division mechanism for mechanical calculating machines, and more particularly to dividend sensing and carriage shifting mechanism for automatically bringing the dividend in the product register of the machine into proper alignment with the divisor in the machine keyboard for carrying out the automatic division operation. The present application is a continuation-in-part of my application S.N. 475,162, filed December 14, 1954, and now abandoned.

Various mechanisms for aligning the dividend in the product register of a calculating machine with the divisor in the keyboard or selection mechanism have been previously proposed, examples of such mechanisms being shown in the following patents: No. 2,666,580, issued January 19, 1954, to G. W. Hopkins et al.; No. 2,365,-507, issued December 19, 1944, to Philip H. Allen; No. 2,653,765, issued September 29, 1953, to Anthony Machado et al.; and No. 2,653,762, issued September 29, 1953, to Grant C. Ellerbeck.

These register aligning mechanisms operate in combination with automatic division mechanism, such as that shown in Patent No. 2,327,981, issued August 31, 1943, to Carl M. F. Friden.

The mechanism of the present invention is particularly designed to save time by eliminating operator decisions for manually aligning the highest order values of the dividend and divisor prior to starting the actual division operation. It is effective to start division immediately upon operation of the division key of the machine if the dividend and divisor are properly aligned, or to make one or more adjustments for alignment of the divisor and dividend in the machine prior to initiation of automatic division if a misalignment of these factors is indicated by the completion of ten machine cycles without an overdraft following the operation of the division key. All cycles performed by the machine in sensing the condition of alignment or misalignment of the dividend and the divisor are retained in the revolutions counter of the machine and become a part of the quotient, so that no sensing cycle is wasted, and no extra, or carriage shifting, cycles are required if the dividend and divisor are properly aligned when the division key is operated, as is frequently the case.

It is thus among the objects of the invention to provide, in a mechanical calculating machine having automatic division mechanism, mechanism for automatically aligning a divisor in the selection mechanism of the machine with a dividend in the product register and eliminating the necessity for operator controlled alignment.

It is a more specific object of the present invention to provide a mechanism which senses an operating condition in which the dividend and divisor are out of proper alignment in the machine and brings the dividend and divisor into proper alignment without the requirement of operator judgment and control and without the loss of machine operating cycles utilized to sense the condition of alignment or misalignment of the dividend and divisor factors in the machine. In its preferred form, this mechanism senses an out-of-alignment condition of the dividend and divisor by determining whether the divisor can be subtracted from the dividend more than nine times without producing an overdraft in the product register carrying the dividend.

It is a further object of the present invention to provide a mechanism which becomes effective whenever the dividend is offset to the left relative to the divisor, so that a series of at least ten subtractive cycles can be made wihout producing an overdraft in the product register, to terminate the subtractive operation of the machine on the tenth subtractive cycle wihout an overdraft, cause a shift of the product register carrying the dividend to its extreme right-hand position relative to the selection mechanism carrying the divisor, and to then begin normal division programming to step the product register ordinally to the left until a condition of alignment is obtained in which the divisor can be subtracted from the dividend at least once without producing an overdraft. On the other hand when the dividend is set to the right of the divisor, producing an immediate overdraft in the product register, the present invention shifts this register to the left by one or more successive ordinal steps until the divisor can be subtracted at least once from the dividend without producing an overdraft, the machine cycles required for left shift alignment being, in all cases, cancelled from the revolutions counter or quotient register in the usual manner.

It is another object of this invention to provide, in a calculating machine for performing division operations, an aligning mechanism which accumulates all actual subtractions of the divisor from the dividend in the quotient register, regardless of whether such subtractions are made before or after the dividend is right-hand shifted relative to the divisor to correct the condition wherein the dividend is offset to the left of the divisor.

It is a still further object of the present invention to provide a dividend-divisor aligning mechanism which does not require that the dividend register be always first shifted to its limiting right-hand position and then ordinally shifted to the left until alignment is obtained.

Another object of this invention is to provide a dividend-divisor aligning mechanism which can be installed in an existing calculating machine with no material modification of the existing mechanism.

While, as stated above, there is no occasion for operator decisions in the normal operation of a machine equipped with an extended tens-transfer mechanism in accordance with the present invention; if the machine were not so provided with a full-carry, or extended tens-transfer, mechanism, and the dividend should include a significant digit and one or more lower order zeros to the left of the highest tens-transfer order of the machine, so that a false overdraft might be caused by subtraction of the divisor from the dividend, it would be necessary for the operator to cause a right shift of the carriage carrying the dividend before initiating division.

Other objects and advantages will become apparent from a consideration of the following description and the appended claims in conjunction with the accompanying drawings wherein:

Fig. 3 is a fragmentary cross-sectional plan view on a plane indicated by the line 3—3 of Fig. 2, with parts omitted to simplify the illustration;

Fig. 4 is a fragmentary rear elevational view of the machine with the cover removed;

Fig. 5 is a diagrammatic plan view from a plane indicated by the line 5—5 of Fig. 4, of automatic carriage shift terminating linkage constituting an operative subassembly of the machine.

Fig. 6 is a fragmentary, right-hand end elevational view of the extreme right-hand control plate of the machine, with the cover removed and with various new mechanisms omitted for the purpose of simplifying the illustration, showing particularly conventional parts of the machine;

Fig. 7 is a fragmentary cross-sectional view of the clutch mechanism of the machine, taken on a plane indicated by the line 7—7 of Fig. 1, behind the control plate of Fig. 6, with parts of the machine omitted to simplify the illustration;

Fig. 8 is a fragmentary, right-hand end elevational view of the machine with the cover removed and with overlying parts omitted to particularly show the revolutions counter reversing mechanism;

Fig. 9 is a fragmentary, left side elevation of the control plate shown in Fig. 6, taken along the plane indicated by the line 7—7 of Fig. 1, but looking toward the right;

Fig. 10 is a diagrammatic view of the left-hand actuator shaft of the machine and the division programming mechanism operated thereby, such as taken along the plane indicated by the line 10—10 of Fig. 3;

Fig. 11 is a fragmentary, right-hand elevational view of the machine substantially along the plane of Fig. 6, but showing the dividend and divisor alignment sensing mechanism applied to the machine in accordance with the present invention, the new mechanism being shown as superimposed over the parts shown in Fig. 6;

Fig. 12 is a view similar to Fig. 11 but with the parts in a different operative position from that shown in Fig. 11;

Fig. 13 is a view similar to Figs. 11 and 12 but with the parts in different operative positions from the positions shown in Figs. 11 and 12;

Fig. 14 is a fragmentary cross-sectional view on an enlarged scale, substantially on a plane indicated by the line 14—14 on Fig. 13;

Fig. 15 is an enlarged view of the left-hand side of the carriage, showing particularly the extended tens-transfer mechanism of the preferred form of my invention, and is taken substantially on a plane indicated by the line 15—15 on Fig. 1;

Fig. 16 is a cross-sectional, left-hand view of the carriage shown in Fig. 15, substantially on a plane indicated by the line 16—16 on Fig. 15;

Fig. 17 is a fragmentary, top plan view of the left-hand portion of the register carriage shown in Fig. 15, with portions broken away and shown in cross-section to better illustrate the construction thereof; and Fig. 18 is a fragmentary, cross-sectional view of the right side of the division control and restore mechanism, substantially on a plane indicated by the line 18—18 on Fig. 3.

Figure 1:
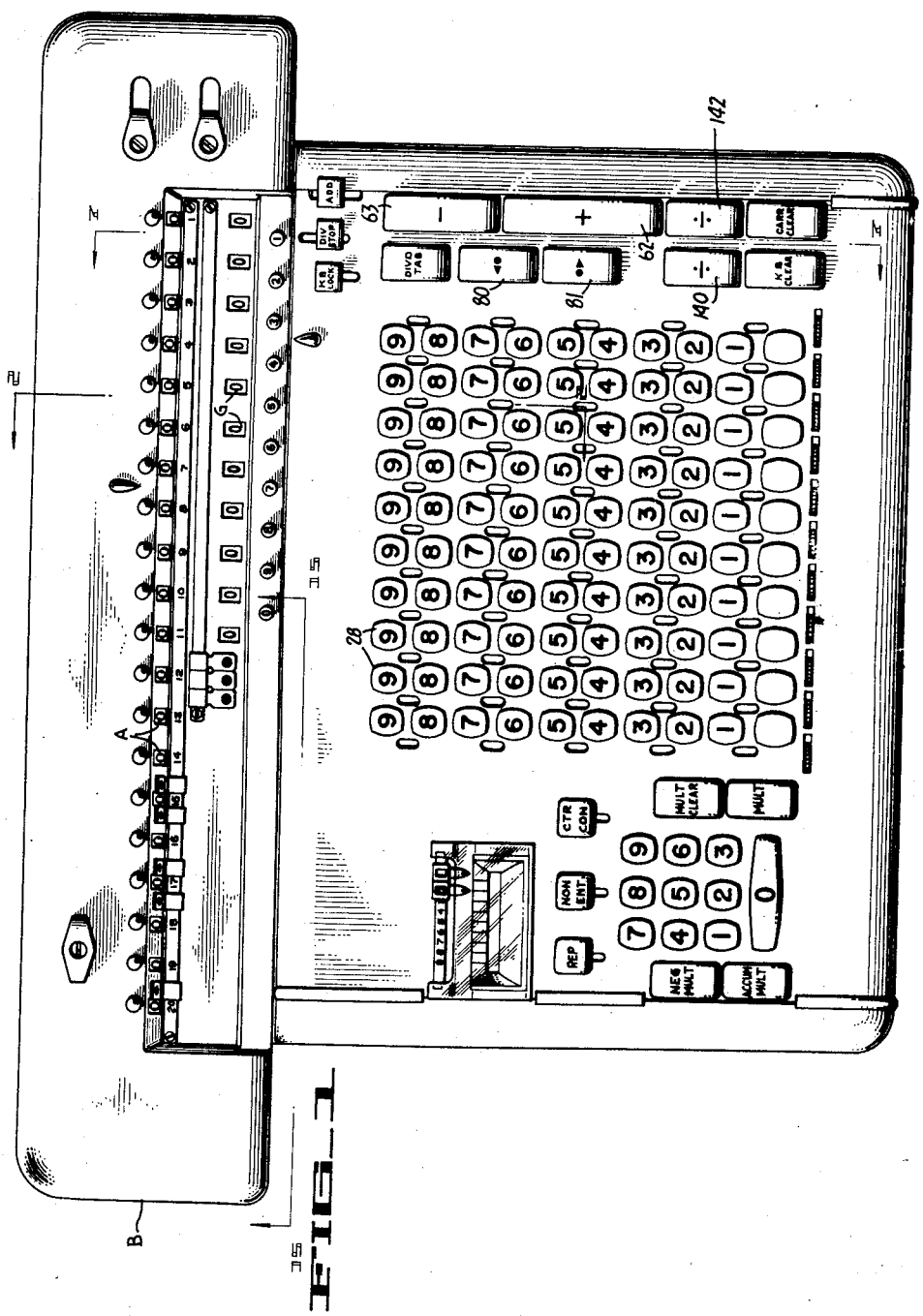
Fig. 1 is a top plan view of a calculating machine to which the dividend and divisor aligning mechanism of the invention may be applied.

With continued reference to the drawings, the machine has a product register A mounted in a longitudinally shiftable carriage B, selection mechanism C including a full keyboard D, actuating mechanism E driven by an electric motor F, revolutions counter mechanism G, a frame H on which the various mechanisms are mounted, and various control and programming devices, as will be later described.

*Frame*

The frame H (Figs. 2, 3 and 4) includes a base plate 15, right-hand and left-hand vertical frame side plates 16 and 17, a control plate 18 disposed to the right of, and parallel to, the right-hand frame plate 16, and transverse frame plates, or members, 19, 20, 21, 22 and 23 extending between the frame side plates in spaced-apart and parallel relationship to each other. The carriage B (Figs. 1 and 2) is supported at its front side on transverse frame plate 20 by means of rollers 24, and at its rear side, on transverse frame member 23 and carries the counter register G as well as the product register A.

*Selection Mechanism*

The selection mechanism (Figs. 1 and 2) comprises a keyboard frame 27 carrying a plurality of manually depressible digit keys 28 mounted for longitudinal movement through the keyboard frame and arranged in ordinal rows with digit keys from "1" to "9" in each row. Selection slides 30 are disposed below the keyboard frame in parallel relationship to each other, being mounted for longitudinal movements. These selection slides are provided with cam notches 31 in their upper edges and the key stems carry pins 32 which engage inclined cam edges of the corresponding notches to differentially move the slides in a forward direction when the keys are depressed. The slides are arranged in pairs with one pair of slides extending along each key row, one slide of each pair being actuated by the "1" to "5" keys and the other slide of the pair being actuated by the "6" to "9" keys of the corresponding key row. Each slide is connected at its rear end to an individual selection gear 33 to differentially position the selection gears in accordance with the digit values of the digit keys depressed in the corresponding key rows.

*Actuating Mechanism*

The actuating mechanism (Fig. 2) includes a plurality of actuating shafts 35 journalled in the cross plates 19 and 21 in uniformly spaced-apart and parallel relationship to each other and driven from the motor F through a speed-reducing gear train including gears 36, 37 and 38 (Fig. 7), a manually controlled, single cycle, or one-rotation, clutch 40, a common drive shaft 41 driven from the clutch, and miter gear connections 42 between the drive shaft and the individual actuator shafts 35. Each actuating shaft carries a pair of stepped actuating drums, as indicated at 43 and 44 in Fig. 2. A plurality of ordinally arranged square shafts 45 are disposed above, and parallel to, the actuating shafts 35 and are journalled in the frame cross-members 19, 21 and 23. There are approximately twice as many square shafts as actuating shafts, with each actuating shaft disposed between two adjacent square shafts. The selection gears 33 are mounted, two on each square shaft, for sliding movement longitudinally of the associated square shafts, so that they can be selectively positioned relative to the corresponding actuating drum 43 or 44. These selection gears are slidably and nonrotatably mounted on the corresponding square shafts, so that during a digitation cycle of the machine, each square shaft will be turned through a number of angular increments corresponding to the number of the digit key depressed in the corresponding key row, as is well-known to the art and shown in the Friden patents noted above. A plus-minus drive spool 46 is slidably mounted on each square shaft immediately below the product register A and is nonrotatably mounted on the corresponding square shaft for turning the associated product register dial through the same number of angular increments or unit spaces as the corresponding square shaft is turned by the associated actuator drum.

*Carriage*

The carriage B (Figs. 1 and 2) comprises an elongated, tubular frame 48 of substantially rectangular cross-sectional shape, a plurality of product and counter register dial assemblies mounted in the frame, and a cover 50 carried by the frame 48.

The dial assemblies 49 of the product register are ordinally spaced longitudinally of the carriage frame. Each dial assembly comprises a shaft 51 journalled in the carriage frame and disposed substantially perpendicular to the corresponding square shaft, a numbered dial 52 on the upper end of shaft 51 and just above the carriage frame 48, a miter gear 53 on the lower end of shaft 51 at the underside of the carriage frame, a tens-transfer setup cam 54 on shaft 51 between gear 53 and the bottom surface of the carriage frame, and a mutilated resetting gear 55 on the shaft within the hollow frame.

A product register clearing rack 56 extends longitudinally of the interior of the frame 48 and has teeth engageable with the resetting gears 55 to return all of the dials 52 to their "0" positions when the clearing rack is shifted to the right relative to the carriage frame, either manually or automatically, by mechanism well-known to the art.

Revolutions counter or quotient register mechanism

The revolutions counter register G is mounted in the carriage forwardly of the product register A and comprises a plurality of ordinally arranged, numbered dials, each mounted on a shaft 57 disposed substantially perpendicular to a corresponding product register dial shaft 51 and carrying an actuating gear 58 and a resetting gear 59. A counter dial actuating mechanism 60, of well-known construction, is mounted in the machine frame and operates the counter register to register the number of operating cycles of the machine. The counter can be cleared by a counter clear rack 61, similar in form and operation to the product register clear rack 56.

Add and subtract mechanism

The machine is provided with an addition control key 62 (Figs. 1 and 9) and a subtraction control key 63 slidably mounted on the control plate 18. A machine cycle control slide 64 (Fig. 9) is slidably mounted on the control plate with cam faces underlying studs on the stems of the addition and subtraction keys, whereby the slide is moved rearwardly whenever either of these keys is manually depressed. As shown in Figs. 7 and 9, the slide 64 is connected by a pin 65 to a slide 66 disposed adjacent the outer side of the frame plate 16. Slide 66 is connected at its rear end to the upper end of a lever 67 pivotally mounted intermediate its length on the frame plate 16 by a pivot screw 68. The upper end of lever 67 is connected by a link 69 to the upper end of the clutch control dog 70 and through lever 67 and link 71 with the switch, not illustrated, of motor F, so that clutch 40 is engaged and motor F is energized whenever the addition key 62 or the subtraction key 63 is manually depressed.

A rockable plus-minus gate 72 (Fig. 2) comprising a rectangular bail mounted at its ends on a rockshaft 126 engages the plus-minus actuating spools 46 and is effective to slide these spools along the square shafts 45 to selectively engage the gears at the front or rear ends of the spools with the product register dial shaft gears 53, so that the dial assemblies may be turned in either an additive or a subtractive direction with a unidirectional rotation of the square shafts. A plus-minus slide 73, also shown in Fig. 9, is slidably mounted on the control plate 18 and is connected at its rear end by an arm 74 with the rockshaft 126 of the plus-minus gate 72. The slide 73 is provided with cam shoulders 75 and 76 which are adapted to be engaged by pins 77 and 78 secured on the addition and subtraction key stems. Thus, when the addition key is depressed, slide 73 is shifted rearwardly, rocking gate 72 rearwardly, to engage the front gears on spools 46 with the corresponding dial shaft gears 53 to condition the register drive for additive rotation of the dials 52. When the subtraction key 63 is depressed, slide 73 is shifted forwardly, rocking gate 72 forwardly to engage the rear gears on spools 46 with the corresponding dial shaft gears 53 to condition the register drive for subtractive rotation of the dials 52.

Carriage shifting mechanism

Figure 2:
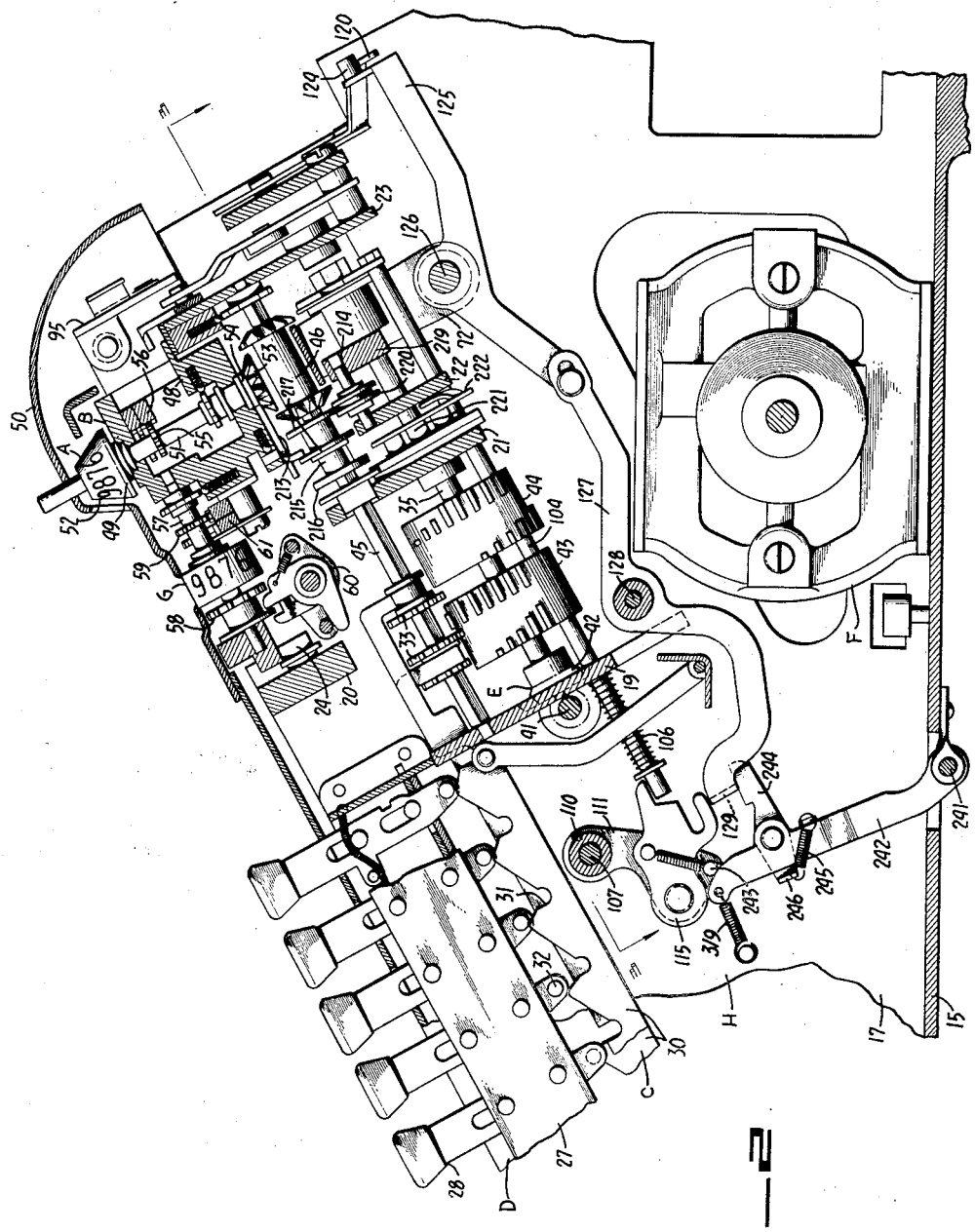
Fig. 2 is a fragmentary cross-sectional view, on an enlarged scale of the selection and register drive mechanisms, such as taken on a plane indicated by the line 2—2 of Fig. 1.

The carriage shifting mechanism is shown in Figs. 2, 3 and 4 and is controlled by the left-hand and right-hand shift control keys 80 and 81, respectively, shown in Fig. 1.

Two of the actuating shafts 35, usually the two right-hand shafts, are extended rearwardly, as indicated at 35a and 35b in Fig. 3, and are provided near their rear ends with clutch collars 82 and 83, respectively, fixed thereon. Complementary clutch collars 84 and 85 are slidably mounted on shaft extensions 35a and 35b, respectively, rearwardly of the clutch collars 82 and 83 and are drivenly connected to the latter. A gear 86 is journalled in transverse frame member 23 and is drivingly engaged by clutch collar 84 when this clutch collar is shifted rearwardly. A gear 87 is also journalled in frame member 23 and drivingly engaged by clutch collar 85 when this clutch collar is shifted rearwardly. A gear sleeve 88 is disposed at the rear side of frame member 23 and journalled thereon, and carries a gear 89 and a disk 90 carrying four angularly spaced-apart pins 91. A speed-reducing compound gear 92 is journalled on frame member 23 and has its smaller gear in mesh with the gear 89. The gear 86 meshes directly with the larger portion of compound gear 92, while gear 87 is drivingly connected to the compound gear through an idler gear, not illustrated, so that shaft 35a is effective to rotate disk 90 in one direction when clutch sleeve 84 is shifted rearwardly and shaft 35b is effective to rotate the disk in the opposite direction when clutch collar 85 is shifted rearwardly. Suitable means, not illustrated but well-known to the art, are provided to preclude a simultaneous rearward shift of both collars 84 and 85.

A rack 95 (Fig. 4) is mounted on the rear side of the carriage B and is engaged by the pins 91 to shift the carriage ordinally in a selected direction when the shift plate, or disk, 90 is rotated. The shift plate 90 is releasably locked against movement by fingers 96 and 97, which are automatically moved out of the way of the block pins 93 when a carriage shifting control is operated. The disk is resiliently centered in ordinal positions of the carriage by the centering detent arms 98 and 99.

Clutch shifting forks 101 and 102 are connected to the clutch collars 84 and 85, respectively. Operating rods 103 and 104 are connnected at their rear ends to the shift forks 101 and 102, respectively, and extend from the shift forks forwardly in spaced-apart and parallel relationship to each other and slidably through corresponding apertures in the transverse frame plate 19. Springs 105 and 106 resiliently urge the rods 103 and 104 forwardly to the inoperative position of the corresponding clutch collars. These rods are selectively moved rearwardly by mechanism actuated by the control keys 80 and 81. This mechanism comprises a shaft 107 extending transversely of the machine frame adjacent the front ends of the rods 103 and 104. The shaft carries near its left-hand end a depending arm 108 and near its right-hand end an upstanding cam arm 109. A sleeve 110 is rotatably mounted in the right-hand portion of the shaft 107 and carries terminally thereof a depending arm 111 and an upstanding cam arm 112. The cam arm 109 is engaged by the left shift key 80 to rock the shaft 107, and the cam arm 112 is engaged by the right shift key 81 to rock the sleeve 110.

The depending arm 108 (Fig. 3) has pivoted to its lower end a live tip 114 which is engageable with the front end of rod 103 to shift the rod rearwardly and engage the left shift carriage drive clutch 84 when the left shift control key is depressed. The depending arm 111 has pivoted to its lower end a live tip 115 which is engageable with the front end of rod 104 to engage the right shift clutch 85 when the right shift control key 81 is depressed. The keys 80 and 81 are connected through an interponent rocker, not shown, to the arm 67 (Fig. 7) and link 69 to the main clutch and motor switch to cause the machine to cycle when either of the carriage shift control keys is depressed, as is shown in Patent No. 2,313,817, issued to Carl M. Friden on March 16, 1943, for "Calculating Machine."

A right shift terminating mechanism is provided and, as shown in Figs. 2, 4, and 5, comprises a lever 116 pivotally mounted intermediate its length on the frame member 23 by a pivot stud 117 and having at one end an abutment formation 118 engaged by the right shift override pawl 119. The right shift override pawl is engaged by a shift pin 91 when the carriage has been shifted to its terminal right-hand position and is rocked thereby, thus rocking the lever 116, if the pin carrying shift disk 90 continues right shift rotation (counter-clockwise in Fig. 4) after the carriage reaches its terminal right-hand position. A lever 120 is pivotally mounted intermediate its length on the end of lever 116 remote from the abutment formation 118. The lever 120 has at one end a cam formation 121 bearing against a stud 122 mounted on frame member 23, so that lever 120 is rocked, in a clockwise direction as viewed in Fig. 4, when lever 116 is rocked, in a counter-clockwise direction as viewed in the same figure, by the override pawl 119. At its end remote from stud 122, lever 120 extends under a stud 124 carried on the rear end of a lever 125 extending longitudinally of the machine and pivotally mounted intermediate its length on the add-substract gate rockshaft 126 extending transversely of the machine forwardly of the transverse frame member 23. At its forward end, lever 125 is pivotally connected to the rear end of a bellcrank lever 127 pivotally mounted intermediate its length on a shaft 128 disposed forwardly of the shaft 126. The forward end of lever 127 is provided with a laterally offset abutment formation 129 disposed under the right shift controlling live tip 115.

When lever 125 is rocked by lever 120, as described above, it rocks lever 127 in a direction such that the abutment formation 129 on this lever raises live tip 115 and releases it from the push rod 104. Spring 106 then shifts rod 104 forwardly and terminates the right shift drive.

The left shift drive is terminated when the carriage reaches its terminal left-hand position by similar mechanism, not illustrated but well-known to the art, such mechanism being actuated by the override pawl at the right-hand end of the carriage to raise the live tip 114 and release the clutch control rod 103.

Revolutions counter reversing mechanism

The operative direction of the revolutions counter is controlled by a shaft 130, shown in Fig. 8, projecting through the right-hand side plate 16 and the control plate 18 and carrying at the outer side of the control plate an actuating disk 131 having diametrically opposed notches 132 and 133 therein. An arm 135 is pivotally connected at its rear end to the rear end of add-subtract slide 73. The arm has at its forward end a fork formation extending partly around the shaft 103 and carrying studs 136 and 137 alternatively engageable in the notches 132 and 133, respectively, of the disk 131. The stud 136 is normally seated in the notch 132 and rocks the shaft 130 to provide a positive accumulating operation of the revolutions counter when the add-subtract gate 72 is in its addition position, and a negative accumulating operation of the revolutions counter when the gate is in its subtraction position. Since division is a subtractive operation, and yet it is necessary to operate the revolutions counter in a positive direction in order to obtain a positive quotient, the operation of the revolutions counter is reversed during division. When the machine is set for division, a lever 138 is rocked to lift the forked end of arm 135 and move stud 136 out of notch 132 and stud 137 into notch 133, so that movement of disk 131 and shaft 130 by slide 73 is reversed and the revolutions counter will be conditioned for positive accumulation even though the machine is performing a subtractive operation.

Tens-carry mechanism

The inboard tens-transfer mechanism for the product register comprises tens-transfer gears 215 (Fig. 2) slidably and nonrotatably mounted, one on each square shaft 45, and each including a gear sleeve having at one end a gear portion 216 and having thereon a pair of spaced-apart annular flanges 217. Ordinally arranged detenting pins 214 are mounted for longitudinal movement in frame cross-members 219 and 22 and each has thereon a pair of spaced-apart annular flanges 220 receiving therebetween one of the flanges 217 of the coordinal transfer gear 215. Ordinally arranged tens-transfer bellcrank levers 213 are disposed against the bottom surface of the carriage frame 48 and each pivotally mounted intermediate its length on the frame 48, all as disclosed in the Friden Patent No. 2,327,981, referred to above.

Each bellcrank lever 213 has its rear end in engagement with the coordinal tens-transfer cam 54 and carries at its front end a depending lug, or abutment formation, disposed between the flanges 217 of the transfer gear 215 of the order next above the tens-transfer cam engaged by the lever 213.

With this arrangement, when a register dial is turned through its tens-transfer, i.e., its "9" to "0" position, its cam rocks the associated lever 213. The rocking of lever 213 moves the transfer gear 215 and detenting pin 214 of the next higher order forwardly to set up a tens-transfer to the next higher order dial of the register.

The actuator shafts 35 carry single-tooth tens-transfer actuators 221 which engage the set transfer gears 215 to complete the tens-transfer near the end of the operating cycle, and also, carry restore cams 222 which restore the set gears 215 through their associated detenting pins 214 to the inoperative position of the transfer gears before the cycle terminates.

A calculating machine, such as that shown in the above-noted Friden patent, having ten keyboard banks, or orders, normally has six actuator shafts and twelve square shafts, so that the tens-transfer mechanism, as briefly described above, will make the tens-carry up to, and including, the twelfth order of the product register. If the product register has more than twelve orders, and is so positioned that some of the register dials are outboard to the left of the twelfth order square shaft, the tens-transfer will not be carried to these outboard dials unless an extended transfer is provided to give a full-carry operation.

One form of such an extended tens-transfer is fully disclosed in my prior Patent No. 2,653,762 and illustrated in Figs. 15, 16, 17 and 18, to be described later in this specification.

Division programming mechanism

A division control key 140 (Figs. 1 and 9) is mounted on the control plate 18 at the inner side of the plate for longitudinal, or vertical, movement and is resiliently urged to its raised, or limiting, upper position by a spring 141. A counter control key 142 (Figs. 1 and 11) is mounted on the outer side of the control plate in side-by-side relationship with the division key 140.

The counter control key 142 is resiliently urged to its upper limiting, or raised, position by a spring 143 and carries at its lower end a roller 144 which engages a cam formation 145 on one end of a lever 146 pivoted intermediate its length on the control plate 18 by a pivot stud 147. The other end of a lever 146 is connected by a pin-and-slot connection to the forward end of a link 148, the rearward end of which is connected to the upper end of lever 138 by a pivotal connection 150.

With this arrangement, when the counter control key 142 is depressed simultaneously with the division key 140, the operating direction of the counter operating means is reversed so that the counter will operate in a positive accumulating direction even though the machine is operating in subtraction.

A division slide 151 (Fig. 9) is mounted on the inner side of the control plate 18 for limited longitudinal movement of the machine and has on its forward end a cam following roller 152. A spring 153 secured to a pin on slide 151 and its other end on a stud secured on frame plate 16 resiliently urges the slide 151 to its limiting forward position. The division key 140 is provided at its lower end with a cam formation 154 which bears against the roller 152 and shifts the slide rearwardly when the division key is depressed.

A division programming arm 155 is pivotally mounted at its lower end on the control plate 18 by a pivot stud 156 and is provided near its upper end with an opening 157 of substantially rectangular shape receiving a shaft 158 carrying an eccentric cam 160 disposed within the opening 157.

A division control lever 161 is pivotally mounted intermediate its length on the upper portion of the programming arm 155 by a pivot stud 162. The lever has an upwardly and rearwardly directed rear end portion provided terminally thereof with a notch 163 and a cam formation 164 rearwardly of the notch. A pin 165 is mounted on the add-subtract gate controlling slide 73 near the open end of notch 163. When division control lever 161 is rocked in a clockwise direction, as viewed in Fig. 9, and the cam 160 is in its normal, or full-cycle, position, the cam formation 164 moves the pin 165 and slide 73 forwardly to place the add-subtract gate 72 in a subtract position and the gate is thereafter locked to the control lever 161 by entry of pin 165 into notch 163.

A bellcrank lever 166 is pivotally mounted at its angle on control plate 18 by a pivot stud 167. The lever has an arm 168 extending upwardly from stud 167 and bearing against the forward side of a pin, or stud, 170 mounted on the main clutch and motor switch controlling slide 64. The bellcrank lever also has an arm 171 extending rearwardly from the pivot stud 167 and pivotally connected at its rearward end to the upper end of a link 172, the lower end of which is pivotally connected to the forward end of division control lever 161. With this arrangement, when division control lever 161 is rocked clockwise to operative position, bellcrank lever 166 is rocked counter-clockwise as viewed in Fig. 9, and shifts slide 64 rearwardly to its switch-closing and clutch-engaging position, thereby causing the machine to cycle, and to continue to cycle after the division key 140 is released and raised to its inoperative position and as long as division control lever 161 remains rocked to its operative position.

A division actuating bellcrank lever 174 (Fig. 6) is disposed at the outer side of control plate 18 and pivotally mounted at its angle on the control plate by a pivot stud 175. This bellcrank lever has a forwardly directed arm 176 and is resiliently urged to turn in a counter-clockwise direction, as viewed in Fig. 6, by a heavy tension spring 177 connected between the arm 176 and a stud 178 projecting from the control plate 18 below the arm 176. A latch, or trigger, lever 180 is pivotally mounted at its lower end on the control plate 18 by a pivot stud 181 located near the bottom edge of the control plate. The latch lever, or trigger, 180 is provided intermediate its length with a shoulder 182 which seats a roller 184 mounted on the forward end of the arm 176 of the actuating lever 174 and holds the actuating lever against movement by the spring 177.

A pin 185 projects from the division slide 151 through an opening in the control plate and bears against the end of a forward extension 186 of the latch lever 180, so that when the division key 140 is depressed, shifting the division slide 151 rearwardly, latch lever 180 is rocked in a clockwise direction as viewed in Fig. 6, releasing the roller 184 from the seat, or shoulder, 182 and freeing the spring 177 to pull the actuating lever arm 176 downwardly. A pin 187 (Fig. 9) projects from the lower end of link 172 through an opening in control plate 18 and below the forward portion of arm 176, so that when arm 176 is pulled down by spring 177, division control lever 161 is rocked through pin 187 to operative position, and bellcrank lever 166 is rocked to move slide 64 to its switch-closing and clutch-engaging position. The division key may now be released and raised to its upper limiting position by spring 141 and the machine will continue to cycle.

During the first cycle of the machine, a pin 188 carried by a gear 190 (Fig. 6) mounted on the main drive shaft 41 engages a cam formation 191 on the upper end of an upwardly extending arm 192 of the actuating lever 174, and rocks this lever back to its normal position in which the roller 184 is again seated on the latch lever shoulder 182.

When the division key is released, the slide 151 is also returned by spring 153 to its original forward position, and, in order to maintain the machine in operation until it completes the division operation, the division control lever 161 must be latched in operative position. This is accomplished by a latch dog 194 (Fig. 7) pivotally mounted near its upper end on the control plate 16 by a pivot stud 195 and having a hook formation 196 at its lower end. This latch dog is biased by a spring 197 to a position in which the hook formation 196 engages a half-round stud 198, carried by the division control lever 161 near the rear end of this lever, when the division control lever is rocked to operative position, and releasably latches the division control lever in operative position.

The division operation can be manually terminated at any time by rocking the manually controlled division stop lever 200. This lever is pivotally mounted intermediate its length on a pivot screw, or stud, 201 carried by the frame plate 16. The lever has on one end a key top, or knob, 202 and on its other end a cam formation 203 engaging an abutment formation 204 on latch lever 194. When knob 202 is moved rearwardly from its intermediate, or neutral position, latch lever 194 is rocked to disengage its hook formation 196 from the half-round pin 198 on division control lever 161, thereby freeing the division control lever and clutch control slide 64 and stopping the machine. Latch lever 194 is also automatically released from pin 198 at the end of a normal division operation, as will later appear.

When the division control lever 161 (Fig. 9) is rocked to operative position, it moves the add-subtract gate 72 of the machine to its subtract position, as explained above, and also conditions the division programming mechanism of the machine for operation. This is accomplished by a pin 205 on the division control lever 161 rocking an arm 206, in a counter-clockwise direction as viewed in Fig. 9. Arm 206 is rigidly secured at one end to a shaft 207 which is journalled in the frame side plates and extends transversely of the machine. At a location near the left-hand actuator shaft, as indicated at 35c in Figs. 3 and 10, an arm 208 projects forwardly from shaft 207 and carries near its forward end a laterally projecting stud 210 received in a slot 211 in the lower end portion of an upwardly and rearwardly directed link 212.

Where the extended tens-transfer is not provided, the highest, or twelfth, order detenting pin 214a is elongated rearwardly and pivotally connected at its rearward end to the upper end of link 212 (Fig. 10). Thus, when an overdraft proceeds through the tens-transfer mechanism to the twelfth, or highest, order of the tens-transfer mechanism, the link 212 is moved downwardly, as is fully explained in the Friden and Machado patents above-mentioned.

The shaft 158 is disposed forwardly of, and parallel to, the shaft 207 and is mounted in the machine frame for both rotational and longitudinal movement. A bail shaped flag 225 is mounted on shaft 158 below the left-hand actuating shaft 35c. The flag is connected to the shaft 158 so that it imparts longitudinal movement to this shaft, but the shaft can rotate freely relative to the flag.

The actuating shaft 35c does not carry actuating drums 43 and 44 but does carry a disk 218 from one side of which a stud 223 projects in eccentric relationship to the shaft 35c. The flag 225 is provided with an upwardly directed tongue portion 224 and with a downwardly directed, and longitudinally extending, abutment portion 225a.

When shaft 207 is rocked by division control lever 161 through arm 206, arm 208 is moved to set the lower end of link 212 on the abutment portion 225a of flag 225 below shaft 158. This conditions the machine for division programming. If now a subtraction cycle causes an overdraft in the product register A with a consequent tens-transfer wave to the dial assembly in registry with the twelfth order detenting pin 214a, forward movement of this pin will move the link 212 downwardly and forwardly, rocking the flag 225 to bring the tongue portion 224 of the flag into position to be engaged by the stud 223 as the actuating shaft 35c is rotated. Engagement of stud 223 with tongue portion 224 will shift shaft 158 to the right against the compression of a spring 227 (Fig. 3) which restores shaft 158 to its original position when the particular programming action is terminated.

A mutilated gear 226 (Figs. 3, 6 and 8) having three equally spaced-apart sets of teeth, of three teeth each, is mounted on the end of shaft 158 at the outer side of control plate 18. A mutilated gear 228, having one set of two teeth, is journalled on a stud 229 in position to mesh with gear 226 when the latter gear is moved to operative position by a right-hand shift of shaft 158, as described above. Gear 228 is continuously driven by a gear 230, also journalled on stud 229, and meshing with gear 190 on main drive shaft 41. Gear 226 is provided with a single peripheral notch between two adjacent sets of its gear teeth. A pin 231 projecting from the control plate 18 seats in this notch when gear 226 is in its inoperative position and restrains the gear against rotational movement.

When shaft 158 is shifted to the right, gear 226 is moved out into alignment with gear 228 and out of engagement with pin 231. During the next three cycles of the machine, the gear 226 will be rotated 120°, or one-third, of a rotation during each cycle. This 120° rotation actually takes place partly at the end of one cycle and partly at the start of the next. Specifically, the overdraft occurs late in a cycle, and the shaft 158 is shifted outwardly, or to the right, shortly thereafter and shortly before the gear 228 reaches the full-cycle position, shown in Fig. 6. However, the gear 226 is given its full increment of rotation before digitation begins in the next cycle. During these succeeding steps gear 226 is held in alignment with gear 228 by the pin 231 until the notch in gear 226 again comes into registry with the pin, at which time gear 226 and shaft 158 will be moved to the left by spring 227 until gear 226 is out of operative alignment with gear 228.

As mentioned above, cam 160 (Fig. 9) is mounted on shaft 158. During the first 120° rotation of this shaft by gear 226, cam 160 rocks arm 155 and moves division control lever 161 rearwardly to move the add-subtract gate 72 to its add position whereupon the divisor is added to the dividend to correct the overdraft which initiated the programming action. This returns the value in the product register to its amount immediately before the overdraft, and restores the detenting pin 214a, thereby releasing the flag 225. During the next cycle of the machine, the carriage is shifted one ordinal space to the left. During the third machine cycle and 120° rotation of cam 160, the add-subtract gate is returned to its subtract position, a subtract operation is carried out, and the parts are returned to their original position, the notch in gear 226 being brought into registry with the pin 231, so that gear 226 and shaft 158 are shifted to the left by spring 227 to bring gear 226 out of alignment with gear 228.

When the cam 160 is moved to its second position 240° away from its original, or full-cycle, position, the add-subtract gate 72 is moved to its neutral position in which the spools 46 are entirely disconnected from the dial shaft gears 53, and is resiliently centered in this neutral position by the centering mechanism 232 of well-known construction, shown in Fig. 8.

The carriage shift is effected by a cam 234 (Fig. 3) on shaft 158 rocking an arm 235 mounted at its proximal end on a shaft 237 parallel to the shaft 158. The cam 234 has a lobe 236 which is shifted under the distal end portion of arm 235 when shaft 158 is shifted to the right, as described above. This lobe is so positioned angularly of the shaft 158 that it engages arm 235 and rocks shaft 237 when cam 160 is near its second position, in which it is rotated approximately 240° from its original, or full-cycle, position.

A left shift control arm 238 is mounted at its proximal end on shaft 237 at a location spaced to the left from arm 235. The arm has its free, or distal, end in engagement with the left shift clutch controlling yoke 101, so that the left shift clutch is engaged to shift the carriage one ordinal space to the left during each overdraft initiated programming action. This shift of the carriage takes place with the shaft 158 shifted to the right and the cam 160 turned to its second rotational position to neutralize the add-subtract gate 72, so that the carriage can shift without interference between the spools 46 and gears 53.

When cam 160 is returned to its original position during the third cycle of the division programming action, the add-subtract gate 72 is returned to its subtract position and the machine will then proceed to subtract until another overdraft occurs.

*Mechanism for aligning dividend and divisor for division*

If the dividend in the product register A is in proper alignment with the divisor in the selection mechanism of the machine at the beginning of the division operation, a number of subtractions between "1" and "9" will be made and an overdraft will then occur. The overdraft will initiate a division programming action, as described above, in which the overdraft will be additively restored to the dividend, the product register carrying the dividend will be shifted one ordinal space to the left relative to the divisor, and subtraction of the divisor from the dividend will be resumed.

If the dividend is misaligned by being spaced too far to the right of the divisor, the first subtraction cycle will produce an overdraft which will establish a division programming action, shifting the product register an ordinal space to the left. Successive programming actions will occur until the product register has been shifted sufficiently to the left for the divisor to be subtracted from the dividend at least once without producing an overdraft, at which time the normal division operation is begun.

The machine cycles producing an overdraft and the subsequent overdraft restoring addition is counted on the quotient register G, but as each overdraft cycle and consequent restore cycle cancel each other, these cycles do not appear in the final quotient.

When normal division has been established, it proceeds until the carriage B has been shifted to its terminal left-hand position, and the machine operates through the subtractive and additive restore cycles. During the restore cycle, a release dog, not shown, pivotally mounted on the right-hand end of the carriage frame 48 against the bottom surface of the frame, engages latching pawl 194 (Fig. 7). The attempted shift immediately following causes the pawl to release the division control lever 161, thereby terminating operation of the machine. Division can be manually terminated at any time by rocking the division stop lever 200, as described above.

When the dividend is spaced to the left of the divisor and a subtraction operation of the machine is established, the divisor can usually be subtracted from the dividend more than nine times without producing an overdraft, and, under some conditions, the machine could run through hundreds, or even thousands, of subtractive cycles before an overdraft occurred. For this reason it has previously been proposed to assume that this last condition will always exist at the beginning of the division operation and to avoid the occurrence of an excessive number of subtractive cycles by first shifting the product register A and carriage B all the way to the right and then stepping the carriage back to the left by successive programming actions until a proper alignment is obtained. This method of alignment, of course, wastes a large number of machine cycles if the dividend and divisor were properly aligned, or the dividend was already to the right of the divisor, at the beginning of the division operation.

A shaft 241 (Fig. 2) extends transversely of the machine below, and parallel to, the shafts 41 and 107 and carries at its right-hand end an arm 266 (Fig. 11), the purpose of which will be later described.

An arm 242 (Fig. 2) projects upwardly from shaft 241 below the right shift arm 111 on sleeve 110, and has its upper end in engagement with a pin 243 carried by arm 111 at the lower end thereof. With this arrangement, when shaft 241 is rocked, in a clockwise direction as viewed in Fig. 2, arm 111 carrying live tip 115 is rocked to move the carriage right shift control rod 104 rearwardly and engage the right shift clutch 85. When arm 242 is rocked to engage the right shift clutch, a latching dog 244 carried by arm 242 is negaged with the offset terminal abutment 129 on lever 127 to maintain the right shift clutch engaged until the carriage reaches its limiting right-hand position. The lever 127 is rocked by the right shift override pawl 119 on the carriage, as has been previously explained, to release the latching pawl 244 from lever 127 and free spring 106 to disengage the right-hand shift clutch 85. Latching pawl 244 is resiliently urged into engagement with the terminal abutment formation 129 of lever 127 by a tension spring 245. Movement of the pawl by the tension spring is limited by a stop 246 carried by the pawl and engaging arm 242, so that the abutment formation 129 can be raised away from the latching pawl when the lever 127 is rocked, in a clockwise direction as viewed in Fig. 2, when the carriage reaches its terminal, right-hand, position.

*Division alignment sensing mechanism*

In order to avoid the waste of machine operating cycles incident to the previously proposed method of shifting the product register carriage all the way to the right and then stepping it back to the left to align the dividend with the divisor before division is begun, mechanism is provided for sensing the condition in which the dividend is to the left of the divisor and establishing the right-hand shift operation only when this condition exists.

The alignment sensing mechanism is shown in Figs. 11, 12, 13 and 14 and comprises a toothed sector 248 pivotally mounted on the control plate 18 by a pivot pin 249 located below the main drive shaft 41. The sector 248 is provided along its curved edge with ratchet teeth 250 and is resiliently urged to rock, in a clockwise direction as viewed in Figs. 11, 12 and 13, about its pivotal mounting 249 by a tension spring 251. The sector is releasably restrained against movement by spring 251 by a holding pawl 252 pivotally mounted at 253 on the control plate 18 and biased by tension spring 254 to interpose one end thereof in the path of the ratchet teeth 250.

An eccentric cam 256 (Fig. 14) is mounted on the right-hand end portion 257 of the main drive shaft 41 at the outer side of the control plate 18. A sleeve 258 surrounds this cam and is slidable on the cam toward and away from the frame plate 18. A spring 259 surrounding the shaft end portion 257 between the outer end of sleeve 258 and a cap 261 secured on the end of the shaft, resiliently urges the sleeve toward the frame plate 18. An actuating pawl 260 depends from the sleeve 258 and a lug, or extension, 263 projects upwardly from the sleeve. The extension 263 is provided with a slot 264 receiving a pin 265 projecting from the control plate 18, thereby forming a fulcrum about which the pawl 263, 258, 260 oscillates from the effect of eccentric 256. Whenever the sleeve 258 is shifted outwardly to align pawl 260 with sector 248, and shaft 41 is rotated, the pawl is operative to feed the sector, counter-clockwise in these figures, a single tooth space with each cycle of machine operation.

The full-cycle position of the sector 248 is shown in Fig. 11 and it will be noted that the ratchet teeth 250 are all to the right of the holding pawl 252, as viewed in this figure, or actually rearwardly of the holding pawl. The shaft 241 is not connected in any way with the division key, but carries on its right-hand end the previously mentioned arm 266 which is engageable by a pin 267 on the sector 248 to rock the shaft under predetermined operating conditions, the arm 266 being clear of the pin 267 when the sector is in its normal, or full-cycle, position, as shown in Fig. 11. Since the shaft 241 is not rocked upon depression of the division key, there will be no initial shifting of the carriage to the right, but a subtracting operation will be immediately begun.

The end of arm 192 of actuating lever 174 (Fig. 11) carrying the cam formation 191 is so shaped that when pin 184 is released from seat 182 of latch lever 180 by depression of the division key 140, and actuating lever 174 is rocked by spring 177 to energize the power drive of the machine and set the division control lever 161, the nose of cam formation 191 moves to the left of extension 263 on sleeve 258 and moves the sleeve 258 to the right, or away from, the frame plate 18, against the force of spring 259 to bring the pawl tooth 260 into operative engagement with the ratchet teeth 250. When division control lever 161 is rocked by actuating lever 174 and sets the add-subtract gate 72 in subtract position, a bellcrank lever 270 pivoted at its angle on control plate 18 by pivot shaft 175 is rocked, in a clockwise direction as viewed in Fig. 11, by a link 273 connected at one end to arm 274 of lever 270 and at its other end by a lost motion connection 276, to an arm 275 depending from rockshaft 126 of the add-subtract gate 72. Rocking of lever 270 by link 273 is assisted by spring 277 and moves a cam formation 278 on the distal end of arm 279 of lever 270 behind, or to the left of, sleeve 258 to hold the pawl tooth 260 in alignment with the ratchet teeth 250 as long as the add-subtract gate 72 is in its subtract position.

Holding pawl 252 is normally held out of engagement with the ratchet teeth 250 by a pin 281 (Fig. 11) on the cam formation 278 engaging a cam edge of the tail portion of holding pawl 252. When lever 270 is rocked, as explained above, holding pawl 252 is released and biased by spring 254 to hold the sector 248 as the sector is moved by the actuating pawl 260.

The machine now being set to operate in subtraction, the sector 248 will be stepped, in a counter-clockwise direction as viewed in Fig. 11, as the actuating pawl tooth 260 is driven by cam 256 on the main drive shaft 41. The actuating lever 174 is restored to its full-cycle position during the first operating cycle, as explained above, leaving the actuating dog 260 held in operative position only by the cam formation 278 on lever 270.

As the end of the cam formation bears against an abutment washer 262 slidably and concentrically mounted on shaft 41 at the inner, or left-hand, end of sleeve 258, lever 270 will not be rocked by the eccentric cam 256 in either position of the lever 270.

If the dividend is to the right of the divisor at the beginning of this operation, there will be an overdraft on the first subtract cycle initiating the division programming action, as described above. When the add-subtract gate 72 is moved to its add position as the result of this overdraft, the cam formation 278 will be moved from behind the sleeve 258, freeing this sleeve for movement to the left to bring the pawl tooth 260 out of alignment with the ratchet teeth 250. At the same time, cam formation 278 rocks holding pawl 252 out of engagement with ratchet teeth 250, freeing sector 248 for return to its normal, or full-cycle, position by spring 251.

The division programming operation will be repeated, if necessary, until the dividend is brought into alignment with the divisor. At this time, or at the beginning if the original alignment had been proper, normal division will proceed, the sector 248 being stepped counter-clockwise during the first series of subtractions of each division operation and released during the division programming action established by an overdraft. Under these conditions, the division control lever 161 remains latched in operative position by the latch dog 194 until the carriage reaches its limiting, left-hand, position, as described above, unless the division is manually terminated by rocking the division stop lever 200.

If the dividend is to the left of the divisor when the division key is depressed, the division control lever 161 will be set, as described above, and a subtraction series will be established. If the relationship between the dividend and the divisor is such that the divisor can be subtracted from the dividend more than nine times without producing an overdraft, the sector 248 will be stepped around its pivotal mounting 249 by the combined action of the actuating pawl 260 and the holding pawl 252 up to the tenth count. When the actuating pawl acts to step the sector the eleventh time, the sector is moved to the position shown in Fig. 13 in which an abutment pin 280 carried by the sector 248 engages the lower end portion of a lever 282 pivotally mounted intermediate its length on the control plate 18 by a pivotal mounting 283, and rocks this lever in a clockwise direction, as viewed in Fig. 13. The upper end of lever 282 engages an abutment formation 284 carried by the manually operable division stop lever 200 and rocks this lever in a clockwise direction, as viewed in Fig. 13. That is, when lever 282 is rocked clockwise, as described above, it rocks the division stop lever 200 and latching pawl 194 to release the pin 198 on division control lever 161 and free the division control lever to move to its inoperative position and terminate the division operation of the machine at the end of that machine cycle.

Immediately after the release of the division control lever 161, a second pin 267 carried by the sector 248 engages and rocks arm 266 on shaft 241, in a clockwise direction as viewed in Fig. 13, thereby rocking shaft 241 to connect the right-hand carriage shift drive of the machine, as has been previously described.

Since the centering mechanism 232 for the add-subtract gate 72 moves the gate to its intermediate, or neutral, position when the add-subtract gate is released from the division control lever, and since this movement of the gate is insufficient to rock the bellcrank lever 270 to the extent required to move the cam formation 278 on this lever from behind the sleeve 258, the holding pawl 252 is not released and the sector 248 is held in its eleven-count position, holding lever 282 in its division stopping position. A link 288 (Fig. 11) is pivotally connected at one end to lever 282 above the pivotal mounting 283 of this lever. The link 288 has at its opposite end a hook formation 289 engaging a tongue 290 which projects from the main clutch and motor switch controlling slide 64 through a notch 291 in the upper edge of the control plate 18, to maintain the main clutch in engagement and the motor in operation as long as the sector 248 is in its eleven-count position, as shown in Fig. 13.

Since the machine will continue to cycle after the sector 248 has been brought to its eleven-count position, the sector is provided at the right-hand end of the series of ratchet teeth 250 with a formation 292 which permits the actuating pawl 260 to continue operation without imparting further movement to the sector.

With the division control lever 161 released, the add-subtract gate in neutral position, the carriage shift drive engaged in right shift the main clutch engaged, and the motor in operation, as described above, the carriage carrying the product or dividend register will now be shifted all the way to the right. It will be noted, however, that the eleven machine cycles utilized to step the sector 248 to its eleven-count position will have been recorded in the quotient register and not cancelled therefrom and that the dividend will have been reduced by eleven subtractions of the divisor therefrom. These eleven machine cycles required to condition the machine for a full-cycle right shift of the carriage are not lost, and a correct quotient is given if division is permitted to continue until its normal termination when the carriage reaches its terminal left-hand position. If division is manually terminated before completion, the quotient in the quotient register will, of course, be incomplete and may be inaccurate if the first eleven counts have not been shifted to the proper quotient orders by the tens-transfer mechanism of the quotient register.

Referring now to Fig. 4, a lever 294 is pivotally mounted intermediate its length on the carriage shift gear frame 295 by a pivotal mounting 296. The lever 294 has its left-hand end (the right-hand end in Fig. 4) riding on the stud 124 and its right-hand end (left-hand end in Fig. 4) bearing on one arm of a bellcrank lever 297 (Fig. 8) pivotally mounted at 320 on the right-hand frame plate 16 immediately below the carriage.

A link 298 is connected at its upper end to bellcrank lever 297 by a pin 322, at a location spaced from the pivotal mounting 320, and at its lower end to an arm of a bellcrank lever 299 mounted by a pivotal mounting 300 on a bracket 301 projecting upwardly from the base 15, as is also shown in Fig. 11. A link, generally indicated at 302, is pivotally connected at one end to the other arm of bellcrank lever 299, and at its other end to the latch lever 180 for the division actuating lever 174 by a lost motion pivotal connection 305.

The link 302 comprises two parts 306 and 307 connected together intermediate the length of the link by a resiliently contractive connection 308. An abutment formation 309 depends from the link part 306 intermediate the length of this part. An abutment formation 310 depends from bellcrank lever 270 below the pivotal mounting 175 of this lever and is engaged by the formation 309 to rock the lever 270 when link 302 is moved rearwardly, as will be later described.

An arm 312 (Fig. 13) is pivotally mounted at one end on the pivot shaft 175 carrying the lever 270 and extends rearwardly from this pivot, carrying near its rear end a stud 314 normally engaged in a notch 315 in the link member 306. An arm 316, mounted at one end on shaft 241, is connected at its other end to arm 312 near the rear end of the latter by a link 321. When shaft 241 is rocked by sector 248 to connect the right shift carriage drive, arm 316 swings arm 312 to move stud 314 out of notch 315 and free link 302 for longitudinal movement. Arm 316 is provided in two longitudinally disposed parts connected together by a resiliently biased knee joint 317, so that shaft 241 can be returned to its neutral, or full-cycle, position when notch 315 is out of alignment with stud 314.

Arm 316 on shaft 241 is used to control pin 314 on arm 312 rather than bellcrank lever 270, since, if an operator were to manually operate the division stop lever 200 immediately after the division key had been operated, this would stop the machine immediately after the first subtraction cycle regardless of whether the division factors were properly aligned or not. At this point the lever 270 would remain rocked to hold pawl 260 in its outward, or operative, position. If pin 314 were controlled by lever 270, pin 314 would now be below link 302, and if the machine were restarted in any operation, the sector feeding mechanism would remain operative, and division would be tripped off when not desired. By controlling the pin 314 by arm 316, division will not be tripped off under the above conditions, since pin 314 would then be in notch 315.

When sector 248 has been stepped to its eleven-count position (Fig. 13) and has rocked lever 282 to stop division, set link 288 (Fig. 11) to maintain the machine cycling, and rocked shaft 241 to connect the right carriage drive shift drive, the carriage will be shifted to its terminal, right-hand, position. Upon the next succeeding machine cycle, the left-hand override pawl 119 will be rocked, rocking the levers 116, 120, 125 and 294. Rocking of lever 125 rocks lever 127 to release the terminal abutment formation 129 of this lever from latch 244 and free the arm 242 to move in a direction to release the carriage right shift drive connection. Rocking of lever 294 pulls the link 302 rearwardly, so that the abutment formation 309 on the link engages abutment formation 310 on lever 270 and rocks this lever to move the cam formation 278 thereon from behind the actuating pawl 260 and disengage the holding pawl 252 from the sector teeth 250. Spring 259 then moves actuating pawl 260 out of engagement with the sector teeth and the sector is freed and returned to its normal, or "0," position by spring 251. The release of the pressure of the sector 248 on arm 266 frees shaft 241 to be rocked to its normal, or full-cycle, position by spring 319 (Fig. 2), thereby completing the disconnection of the right-hand carriage shift drive and biasing arm 316 to return stud 314 into notch 315 when the notch returns to registry with the stud. Simultaneously, with the release of sector 248, link 302 rocks latch lever 180 to a position at which pin 184 is released from shoulder 182, thereby tripping division by releasing the division actuating lever 174. Since all of the machine cycles from the tenth count on the ratchet sector to the tripping of division after the carriage reached its terminal right-hand position were performed with the add-subtract gate in its neutral position, the revolutions counter was blocked and none of these cycles were recorded in the quotient register.

When division is retripped, a series of division programming actions is established and is continued until the carriage has been stepped to the left to a position at which at least one subtraction of the divisor from the dividend can be made without an overdraft. These division programming actions are self-cancelling, since each includes a subtractive cycle and an additive cycle, and produce no counts in the quotient register.

As soon as the right-hand carriage shift drive has been disconnected, the override pawl 119 is freed from the shift drive, so that lever 294 and linkage connecting it to latch lever 180 is released to relatch the division actuating lever 174 when the latter is restored to normal, or inactive, position by the pin 188 and cam formation 191. This shifts link 302 so that stud 314 re-enters notch 315. The link is held against tripping division by movement of the carriage to its right-hand terminal position except when such carriage shift is occasioned by an eleven-count movement of the ratchet sector 248, as described above. Release of sector 248 from the holding pawl 252 by the rocking of lever 270 by link 302, as described above, frees spring 251 to return the ratchet sector to its full-cycle, or "0" position against the stop stud 323. This removes stud 280 from the lower end of lever 282, freeing the lever 282 to swing in a counter-clockwise direction, as viewed in Fig. 13, releasing stop lever 200 from the upper end of lever 282. Spring 197 is then free to swing the division latch, or hook, arm 194 to re-engage the pin 198 on division control lever 161 and latch this lever in operative position. The counter-clockwise swinging movement of lever 282 also moves link 288 to free the hook end 289 of this link from the tongue 290 and thereby free the clutch and clutch control slide 64 for control by the division control lever 161.

The add-subtract gate 72 will be in its neutral, or centered, position at the end of the full right shift. In order that the lever 270 can be rocked by link 273 to remove the cam formation 278 from behind the sleeve 253 without moving the gate from its neutral position, lost motion is provided in the connection 276 between the link 273 and the arm 275 by providing in the link a longitudinally extending slot receiving a pin projecting from the lower end of the arm 275.

Also, if the carriage should be moved to its right-hand terminal position in some operation other than division, in which case the stud 314 is in the notch 315, the right shift override pawl will be able to rock and move the link member 307 without moving the link member 306 because of the flexible connection 308 provided between the link members 306 and 307.

It may happen on rare occasions that there will be a 0 in the order of the product, or dividend, register in registry with the overdraft responsive pin 214a with a significant digit outboard, or to the left of, this 0, in some cases there being one or more intervening 0's between the outboard digit and the ordinal position in the product register in registry with pin 214a. In such a case there could be an apparent overdraft at the ordinal position of the overdraft responsive pin without there being an actual overdraft of the entire value, including the outboard digit, in the product register. Under these conditions, the operator may make a preliminary adjustment of the machine by using the right shift key 81 to shift the product register to the right until the outboard digit in the product register is in registry with or to the right of, the overdraft responsive pin 214a.

However, if the machine is equipped with a full-carry mechanism for the product register, as shown in Figs. 15 to 18, inclusive, the operator is relieved of this responsibility, since, in that case, an actual overdraft would be carried to the highest order of the product register and there would be no apparent overdraft to initiate a division programming operation.

The application of the eleven-count division aligning mechanism to a machine having a full-carry tens-transfer mechanism for the product register, as shown in Figs. 15 to 18, inclusive, is therefore presented as a modified form of the invention.

Where the extended tens-transfer is used, the rearward elongation of the twelfth order detenting pin 214a is eliminated and the link 212 is moved to rock the flag bail 221 by other means presently to be described in connection with Figs. 15 to 18, inclusive.

The extended tens-transfer mechanism, as shown in Figs. 15 to 18, inclusive, is normally disabled and is brought into operation with respect to the left-hand outboard register dials only in the event of a transfer occurring in the highest order controlled by the regular transfer mechanism of the machine described above. Also, this extended tens-transfer mechanism is capable of being disabled order-by-order as the outboard register dials are shifted inboard, so as to cause the extended tens-transfer mechanism to remain effective only as to those register dial orders disposed to the left, or outboard, of the highest order of the regular tens-transfer mechanism of the machine, and is of the simultaneous type and controlled for additive and subtractive operation by the add-subtract gate of the machine.

Each of the register dial shafts 51 lying beyond the regular transfer mechanism of the machine, when the register carriage is in its extreme left-hand position, is provided with a sensing disk 330 (Fig. 16) and a tens-transfer actuating gear 331. The disk 330 is adapted to be sensed by a sensing finger 332 which is arranged to control an actuating tooth 333 cooperating with the gear 331 in the next higher order of the accumulator. The finger 332 and tooth 333 form a part of an actuator assembly which is supported on an actuator shaft 334 journalled between the left-hand end plate 335 of the carriage and a bracket 336 (Fig. 15) mounted on the framework of the carriage. The shaft 334 is adapted to receive endwise shifting movement by means of suitable actuating mechanism and is arranged to impart these movements to the sensing fingers 332 and actuating teeth 333 of the actuator assembly, as disclosed in the above-mentioned Patent No. 2,653,762.

As the carriage moves toward the right, as viewed in Fig. 15, additional orders of the register will be moved inboard, and means is provided for disabling the auxiliary transfer mechanism in each order as it comes within the range of the regular transfer mechanism of the machine. This means includes a camming rail 337 (Fig. 15) mounted on the framework of the machine and adapted to engage rollers 338 carried by pivoted coupling members 339, so as to uncouple the actuating teeth from the sensing fingers as the register, or accumulator, dial assemblies are moved inboard of the regular tens-carry mechanism of the machine. The actuator teeth and sensing fingers are also provided with depending tails 340 and 341, respectively, which, as they pass inboard, move behind the edge of a fixed rail 342 so as to restrain the operation of these parts in their inboard positions.

Means is also provided for preventing operation of the outboard, or auxiliary, transfer mechanism, except when a tens-transfer occurs in the highest inboard order of the register. This means comprises a tiltable blocking member 343 which lies in the plane of rail 342 and immediately to the left thereof, as shown in Fig. 15, so as to engage the tail 340 of the actuating tooth associated with the lowest outboard order, thereby disabling all higher orders of the auxiliary transfer mechanism. As shown in Fig. 16, the member 343 is adapted to be tilted to an ineffective position whenever the highest inboard transfer lever 213 is actuated so as to enable the auxiliary transfer mechanism for the outboard orders to function to effect any required transfer operation therein.

Oscillatory movement of the shaft 334 is effected by means of a cam 348 mounted on a cam shaft 349 journalled between the end plate 335 and the bracket 336. Engaging the cam 348 is a grooved roller 350 slidably and rotatably mounted on a pin which is mounted on an arm 351 secured to the shaft 334.

Reciprocatory movement of the shaft 349 is effected by a drum cam 352 (Fig. 15) mounted on the left-hand end of shaft 349. This cam has a sinuous groove 353 formed therein which is engaged by a pin 354 (Fig. 16) secured to the shaft 334. This pin normally lies midway along one of the inclined portions of the groove 353 so that, upon rotation of the cam shaft 349 in either direction, the actuator shaft 334 is first shifted endwise one-half step in one direction or the other, after which the shaft is rocked by cam 348 during the dwell provided in the groove 353. The actuator shaft 334 is then shifted longitudinally a full step in the opposite direction so as to provide an actuating stroke for the actuating teeth 333, after which the shaft is rocked by the cam 348 so as to disengage the actuator from the gears 331. The shaft 334 is then shifted one-half step in a longitudinal direction so as to return this shaft to its starting position.

The cam shaft 349 carries a long pinion 358 (Fig. 15) which is engaged by a small gear 359 journalled on a stud 360 supported on a bracket 361 attached to the left side frame plate 17. Gear 359 meshes with a larger gear 362 which is journalled on a stud 363 carried by a bracket 364 which is attached to the left side frame plate. Secured to the gear 362 is a small gear 365 which meshes with a large gear 366 fastened on the left-hand end of a stub shaft 367 which is journalled in a bushing mounted in the left side frame plate 17. Secured to the right-hand end of the shaft 367 is a ten-tooth gear 368 which is adapted to engage with one or the other of a pair of ten-tooth gears 369 mounted on either end of a sleeve which is slidably but non-rotatably mounted on a square shaft 370 which is journalled at its forward end in the crossbar 19 and at its rear end in a bracket 371 fastened to the framework of the machine. The selective engagement of the gear 368 with one or the other of the gears 369 is controlled from the add-subtract gate shaft 126 by means of an arm 372 mounted on the left-hand end of this shaft. Arm 372 is connected by a link 373 with the lower end of an arm 374 secured to a shaft 375 journalled between the left side frame plate 17 and a bracket 376 (Fig. 3) supported on the crossbar 19. Secured to the right-hand end of the shaft 375 is an arm 377, which, at its upper end, carries a strap 378 which lies between the gears 369. Hence, whenever the gate rockshaft 126 is rocked to condition the machine for addition or subtraction, one or the other of the gears 369 will be engaged with the gear 368 so as to cause rotation of the cam shaft 349 in the appropriate direction.

Secured to the forward end of the square shaft 370 (Fig. 16) is a gear 380 which is adapted to be operated by a pawl 381 (Fig. 3) which is apertured to receive an eccentric 382 secured to the forward end of the leftmost actuator shaft 35c. The lower end of the pawl 381 is provided with a slot which engages a stud 383 mounted on the crossbar 19. Hence, for each operation of the transverse power shaft 41, the pawl 381 will be given one complete cycle of movement, whereby a tooth 384 (Fig. 3) formed on the upper end of pawl 381 will engage with the teeth of the ten-tooth gear 380 and hence rotate the shaft 370 through one-tenth of a rotation. In the event the gears 369 are shifted from the rocking of the plus-minus gate 72 and linkage 372, 373 and 374, a similar rotational movement of shaft 367 and gear 366 will be accomplished. The gear ratio between the shaft 367 and the cam shaft 349 is such that, for each one-tenth rotation of shaft 367, the cam shaft will receive one complete rotation. Hence, on each cycle of the machine, the actuating teeth 333 will be given one complete operation, thereby causing any required transfers in the outboard orders of the register to be accomplished.

As shown in Fig. 17, the highest order register dial shaft 51 is provided with a cam 395 which is arranged to cooperate with a tooth 396 formed on a crossbar 397. The bar 397 is fastened at either end to the side arms 398 of a bail 399 which is pivotally supported at either end on brackets 400 which are secured to the carriage frame 48. The bail 399 is engaged by the notched end of a lever 401 (Fig. 16) which is pivotally mounted on a screw 402 fastened to the left side plate 17. The arm 401 is arranged to be detented in either one of two different positions by a detent lever 403 which is pivoted on the add-subtract gate shaft 126 and urged into engagement in one or the other of two notches provided in the lower end of lever 401 by a spring 404. The lever 401 carries a pin 405 which passes through an aperture in the left side frame 17. The pin 405 pivotally supports the rear end of the overdraft control link 212a (Fig. 18), which link is supported at its forward end by a pin 210 which is received in an elongated slot provided in the link. The pin 210 is carried by the arm 208 which is secured to the transverse shaft 207 which is journalled between the left side frame 17 and the control plate 18. At its right-hand end, the shaft 207 carries the arm 206 (Fig. 9) described above, the forward end of which lies above the pin 205 on the division control lever 161. Hence, when the rear end of the division lever is elevated upon the initiation of a division operation, the shaft 207 will be rocked, clockwise as viewed from the right side of the machine, thereby causing the pin 210 to lift the forward end of the link 212a to a position where it will lie behind the overdraft control flag 225 which comprises a bail loosely pivoted on the control shaft 158. Now, if after the division operation has been initiated, an overdraft occurs which produces a tens-carry through the auxiliary, or outboard, transfer mechanism to the highest order register dial, the shaft 51 of which carries the overdraft sensing cam 395, the bail 399 and arm 401 will be rocked by pressure of the cam lobe against the bail tooth 396. This will shift the pin 405 from its normal, rearwardly disposed, position, as shown in Figs. 16 and 18, to a forwardly disposed position, thereby rocking the flag 225 to position the flag tongue 224 (Fig. 10) in the path of the eccentric pin 223 on actuator shaft 35c, and establish a division overdraft program operation.

When the flag tongue 224 is then engaged by the pin 223 carried by disk 218 on actuator shaft 35c (Figs. 3 and 10), shaft 158 is shifted to the right, moving mutilated division programming gear 226 into alignment with the mutilated drive gear 228, as has been previously described.

The gear 228 will then, in three machine cycles, turn the programming gear 226 through one complete rotation, establishing consecutively an addition, or restore, cycle, a one-order left shift cycle and reinitiate plural subtraction cycles. Since the gear 226 will be held outwardly in position to mesh with the gear 228 by the pin 231 after the beginning of the first division programming cycle, it is necessary to maintain the flag 225 in rocked position for only the first portion of the first division programming cycle. Once the gear 226 has been moved outwardly to mesh with gear 228, and the notch in gear 226 has been turned away from pin 231, the flag may be returned to its normal position.

This is accomplished by a cam 412 mounted on the main drive shaft 41 (Fig. 18). Cam 412 has a lobe 409 which engages a roller 411 mounted on a lever 413, the upper end of which is pivotally mounted on a fixed pivot 415. The roller 411 is disposed intermediate the length of the lever 413 and the lower end of this lever is pivotally connected to the front end of a link 414. The rearward end of link 414 is provided with a longitudinally extending slot 416 receiving the pin 405 and is resiliently urged in a forward direction by a spring 417.

The cam 412 is angularly positioned on the shaft 41 so that the cam lobe 409 engages the roller 411 after the notch in gear 226 has been turned away from pin 231 and after the lobe on cam 395 (Fig. 17) has been turned away from the adjacent end of the sensing finger 396. When the cam lobe 409 engages the roller 411, it rocks the lever 413, in a counter-clockwise direction as viewed in Fig. 18, and shifts the link 414 rearwardly. Rearward movement of link 414 moves link 212a rearwardly to release the division programming flag 225 and also moves the lower end of arm 401 rearwardly to the normal, or inoperative, position of this arm. Arm 401 is detented in its normal, or inoperative, position by the detent pawl 403.

With the full-carry, or extended tens-transfer, mechanism, as briefly described above, in the calculating machine to which the eleven-count division aligner mechanism of this invention is applied, a division programming operation will not be initiated by a twelfth order false overdraft when there is a digit value in an outboard order of the product register succeeded by one or more intervening zeros. Since any overdraft in the extended transfer mechanism must occur in the highest order of the product register, if the dividend set up in this register includes a digit value in an outboard order of the register followed by one or more intervening zeros, no overdraft will occur in division until the highest order of the register carrying a digit value has been returned through its "0" position. Thus, with the fully-carry mechanism included, the operator does not have to watch the dividend setting of the product register or adjust the carriage position to make sure that the product register does not carry a value disposed outboard, or to the left, of the actuating mechanism of the machine with one or more zeros intervening between such value and the next lower order carrying a digit value.

I claim:

1. In a calculating machine having key-operated selection mechanism, a product register longitudinally shiftable to the right and left relative to said selection mechanism, a quotient register effective to count the operating cycles of the machine, actuating mechanism, register shifting mechanism driven by said actuating mechanism and selectively controlled to effect a left-hand or a right-hand shift of said register, means controlling the additive or subtractive entry of values from said selection mechanism into said product register, division control means effective to establish a repetitive subtraction operation of the machine, and division programming mechanism effective in response to an overdraft in said product register to establish an operating program including at least one additive cycle and a shift of the carriage one ordinal space to the left followed by a resumption of divisional operation of the machine, a division aligning means driven by said actuating mechanism and effective only in the event of ten consecutive subtractive cycles of the machine without producing an overdraft in said product register to terminate the divisional operation, actuate said shifting mechanism to shift said product register to its extreme right-hand position relative to said selection mechanism and then effect a resumption of the divisional operation of the machine to produce an overdraft in said product register and bring said division programming mechanism into operation, the ten subtractive cycles required to effect operation of said division aligning mechanism being retained in said quotient register and the dividend in said product register being reduced by the ten subtractions of the divisor in said selection mechanism therefrom.

2. In a calculating machine having key-operated selection mechanism, a carriage longitudinally shiftable to the right and left relative to said selection mechanism, a product register carried by said carriage, a quotient register effective to count the operating cycles of the machine, actuating mechanism, carriage shifting mechanism driven by said actuating mechanism and selectively controlled to effect a left-hand or a right-hand shift of said carriage, means controlling the additive or subtractive entry of values from said selection mechanism into said product register, division control means effective to establish a repetitive subtraction operation of the machine, and division programming mechanism effective in response to an overdraft in said product register to establish an operating program including an additive cycle to restore the overdraft, a shift of the carriage one ordinal space to the left and a resumption of the subtractive operation of the machine, a division aligning means effective only in the event of ten consecutive subtractive cycles of the machine without producing an overdraft in said product register to terminate the subtractive operation, actuate said carriage shifting mechanism to shift said carriage to its extreme right-hand position relative to said selection mechanism and then effect a resumption of the subtractive operation of the machine to produce an overdraft in said product register and bring said division programming mechanism into operation, the ten subtractive cycles required to effect operation of said division aligning mechanism being retained in said quotient register and the dividend in said product register being reduced by the ten subtractions of the divisor in said selection mechanism therefrom.

3. In a calculating machine having a key-operated selection mechanism, a carriage longitudinally shiftable to the left and to the right relative to the selection mechanism, a product register carried by said carriage, a quotient register effective to count the operating cycles of the machine, actuating mechanism effective to cycle the machine and enter values either additively or subtractively from said selection mechanism into said product register, carriage shifting mechanism driven by said actuating mechanism and effective to selectively shift the carriage to the right or left relative to the selection mechanism, division control mechanism effective to condition the machine to repeatedly subtract a divisor standing in said selection mechanism from a dividend standing in said product register, and division programming mechanism effective upon the occurrence of an overdraft in said product register to suspend the subtractive operation of the machine, correct the overdraft by an additive cycle of the machine, actuate said carriage shifting mechanism to shift said carriage one ordinal space to the left and resume the subtractive operation of the machine, a division aligning mechanism for effecting the shifting of said carriage when the dividend is out of alignment with the divisor in a left-hand direction comprising a movable member, an element driven by said actuating mechanism to step said movable member one step in a predetermined direction for each machine cycle, means actuated by said movable member to suspend subtractive operation of the machine and enable said carriage shifting mechanism to shift the carriage to the right when said movable member is stepped a predetermined number of times before the occurrence of an overdraft in said product register, and means enabled by said carriage upon reaching its extreme right-hand position to restore said movable member to its "0" position and to disconnect said carriage shift mechanism and resume the subtractive operation of the machine and the operation of said division programming mechanism.

4. In a calculating machine having a key-operated selection mechanism, a carriage longitudinally shiftable to the left and to the right relative to the selection mechanism, a product register carried by said carriage, a quotient register effective to count the operating cycles of the machine, actuating mechanism effective to cycle the machine and enter values either additively or subtractively from said selection mechanism into said product register, carriage shifting mechanism driven by said actuating mechanism and effective to selectively shift the carriage to the right or left relative to the selection mechanism, division control mechanism effective to condition the machine to repeatedly subtract a divisor standing in said selection mechanism from a dividend standing in said product register, and division programming mechanism effective upon the occurrence of an overdraft in said product register to suspend the subtractive operation of the machine, correct the overdraft by an additive cycle of the machine, actuate said carriage shifting mechanism to shift said carriage one ordinal space to the left and resume the subtractive operation of the machine, a division aligning mechanism for effecting the shifting of said carriage when the dividend is out of alignment with the divisor in a left-hand direction comprising a rotatably supported ratchet member, an actuating pawl driven by said actuating mechanism to step said ratchet member one tooth in a predetermined direction for each machine cycle, resilient means biasing said ratchet member in the opposite direction and a holding pawl holding said ratchet member against the force of said resilient means, means actuated by said ratchet member to suspend subtractive operation of the machine and enable said carriage shifting mechanism to shift the carriage to the right when said ratchet member is stepped a predetermined number of times before the occurrence of an overdraft in said product register, and means actuated by said carriage upon reaching its extreme right-hand position to disable said pawls and enable said resilient means to restore said ratchet member to its "0" position and to disconnect said carriage shift mechanism and resume the subtractive operation of the machine and the operation of said division programming mechanism.

5. In a calculating machine having a plural order selection mechanism, a dividend register having a greater number of orders than said selection mechanism and movable relative to said selection mechanism, a quotient register, actuating mechanism functionally disposed between said selection mechanism and said dividend register for entering values from said selection mechanism into said dividend register and having the same number of orders as said selection mechanism, tens-transfer mechanism extending throughout the orders of said actuating mechanism and effective to carry a tens-transfer to the order of said dividend register in registry with the highest order of said actuating mechanism, overdraft responsive means disposed adjacent the highest order of said actuating mechanism and responsive to a tens-carry into the corresponding order of said dividend register, division mechanism effective to repeatedly subtract a divisor in said selection mechanism from a dividend in said dividend register, a manipulatable control for said division mechanism, and division programming mechanism conditioned for operation by said manipulatable control and activated by said overdraft responsive means to cause a restoration to the dividend register of the value subtracted therefrom and a one order movement of said dividend register relative to said actuating mechanism in a direction to move lower orders of said dividend register toward higher orders of said actuating mechanism, sensing mechanism driven by said actuating mechanism and activated by manipulation of said control means and operable when the division operation established by manipulation of said control means proceeds through ten successive subtractions in the initial position of the dividend register without causing operation of said overdraft responsive means, means operable by said sensing means when so operated through such ten successive subtractions without operating said overdraft responsive means for disabling said division mechanism and said division programming mechanism and effecting a relative movement of said dividend register and said actuating mechanism in a direction to move the higher orders of said dividend register toward the lower orders of said actuating mechanism, and means responsive to relative movement of said dividend register and said actuating mechanism in the last-mentioned direction to a predetermined relative position to disable said sensing mechanism and reactivate said division mechanism and said division programming mechanism.

6. In a calculating machine having a plural order selection mechanism, a dividend register having a greater number of orders than said selection mechanism and movable relative to said selection mechanism, a quotient register, actuating mechanism functionally interposed between said selection mechanism and said dividend register for entering values from said selection mechanism into said dividend register additively or subtractively, operator controlled shift means driven by said actuating mechanism for selectively moving said dividend register relative to said selection mechanism and said actuating mechanism in a direction to move the higher orders of said dividend register toward the lower orders of said actuating mechanism or in a direction to move the lower orders of said dividend register toward the higher orders of said actuating mechanism, tens-transfer mechanism extending throughout the orders of said actuating mechanism and effective to carry a tens-transfer at least to the order of said dividend register in registry with the highest order of said actuating mechanism, overdraft responsive means responsive to a tens-transfer into the highest order operated by said tens-transfer mechanism, division mechanism effective when activated to, repeatedly subtract a divisor from a dividend in said dividend register, operator controlled tripping means for activating said division mechanism, and division programming mechanism activated by said overdraft responsive means to cause a restoration to the dividend register of the value subtracted therefrom and a one order movement of said dividend register relative to said actuating mechanism in a direction to move lower orders of said dividend register toward higher orders of said actuating mechanism, sensing mechanism driven by said actuating mechanism and activated by operation of said tripping means and operable when the division operation established by operation of said tripping means proceeds through a predetermined number of successive subtractions without causing operation of said overdraft responsive means, means operated by said sensing means when so operated through such predetermined number of successive subtractions without operating said overdraft responsive means for disabling said division mechanism and said division programming mechanism and effecting a relative movement of said dividend register and said actuating mechanism in a direction to move the higher orders of said dividend register toward the lower orders of said actuating mechanism, and means responsive to relative movement of said dividend register and said actuating mechanism in the last-mentioned direction to a predetermined relative position to disable said sensing mechanism and reactivate said division mechanism and said division programming mechanism.

7. In a calculating machine having a plural order selection mechanism, a plural order dividend register movable relative to said selection mechanism in directions to move its orders across the orders of said selection mechanism, a quotient register, actuating mechanism effective to enter values from said selection mechanism into said dividend register and having orders in registry with the orders of said selection mechanism, tens-transfer mechanism extending throughout the orders of said actuating mechanism and effective to carry a tens-transfer to an order of said dividend register at least as high as the order thereof in registry with the highest order of said actuating mechanism, overdraft responsive means responsive to a tens-transfer to the highest order of said dividend register to which tens-transfers are carried, division mechanism effective to repeatedly subtract a divisor in the selection mechanism from a dividend in said dividend register, operator controlled activating means for said division mechanism, and division programming mechanism activated by said overdraft responsive means when a subtraction causes an overdraft in said dividend register to restore to said dividend register the value subtracted therefrom and cause a one order relative movement of said dividend register and said actuating mechanism in a direction to move lower orders of said dividend register toward higher orders of said actuating mechanism, actuator driven sensing mechanism activated by operation of said operator controlled means and responsive to ten successive subtractions in which the divisor is repeatedly subtracted from the dividend in the original dividend register position without creating an overdraft, means operable by said sensing mechanism for disabling said division mechanism and said division programming mechanism and effecting a relative movement of said dividend register and said actuating mechanism in a direction to move higher orders of said dividend register toward lower orders of said actuating mechanism to a predetermined position of said dividend register relative to said actuating mechanism, and means responsive to relative movement of said dividend register and said actuating mechanism to said predetermined relative position to disable said sensing mechanism and reactivate said division mechanism and said division programming mechanism.

8. In a calculating machine having a plural order dividend register, plural order selection mechanism, plural order actuating mechanism functionally interposed between said selection mechanism and said dividend register for entering values from the former into the latter, operator controlled shift means effective to relatively move said dividend register and said actuating mechanism in directions such that the orders of one are moved across the orders of the other, tens-transfer mechanism extending throughout the orders of said actuator mechanism and effective to carry a tens-transfer to an order of said dividend register at least as high as the order thereof in registry with the highest order of said actuating mechanism, overdraft responsive means responsive to tens-transfers to the highest order of said dividend register to which a tens-transfer is carried, division mechanism effective to repeatedly subtract a divisor from a dividend in said dividend register and rendered effective by said overdraft responsive means in response to an overdraft in said dividend register to restore to said dividend register the value the subtraction of which created the overdraft and cause a one order relative movement of said dividend register and said actuating mechanism in a direction to move the lower orders of said dividend register toward the higher orders of said actuating mechanism, and operator controlled activating means for said division mechanism, sensing mechanism operated by said actuating mechanism and responsive to a predetermined number of successive subtractions of said divisor from said dividend without creation of an overdraft in the dividend register to disable said division mechanism and effect a relative movement of said dividend register and said actuating mechanism in a direction to move higher orders of said dividend register toward lower orders of said actuating mechanism to a predetermined position of said dividend register relative to said actuating mechanism, means responsive to relative movement of said dividend register and said actuating mechanism to said predetermined relative position to disable said sensing mechanism and reactivate said division mechanism, and means operated by said overdraft responsive means for disabling said sensing mechanism.

9. In combination with a cyclically operable calculating machine having a key-operated and ordinally arranged selection mechanism, an ordinally arranged product register, actuating mechanism effective to cycle the machine and enter values either additively or subtractively from said selection mechanism into said product register, shifting means for shifting said product register to a predetermined ordinal position with respect to said selection mechanism, a member movably supported on the machine, an element driven by said actuating mechanism to step said movable member one step in a predetermined direction for each machine cycle, and means actuated by said movable member to suspend subtractive operation of the machine when said movable member is stepped a predetermined number of times during subtraction before the sum of the predetermined number of subtractions exceeds the value in said product register and simultaneously initiate operation of said shifting means.

10. In combination with a cyclically operable calculating machine having an ordinally arranged key-operated selection mechanism, an ordinally arranged product register, actuating mechanism effective to cycle the machine and enter values either additively or subtractively from said selection mechanism into said product register, shifting means for shifting said product register to a predetermined ordinal position with respect to said selection mechanism, a ratchet member rockably supported on the machine, an actuating pawl driven by said actuating mechanism to step said ratchet member one tooth in a predetermined direction for each machine cycle, resilient means biasing said ratchet member in the opposite direction, and a holding pawl holding said ratchet member against the force of said resilient means, and means actuated by said ratchet member to suspend subtractive operation of the machine when said ratchet member is stepped a predetermined number of times before the sum of the repeated subtractions exceeds the value in said product register and simultaneously to initiate operation of said shifting means.

11. In a calculating machine having a selection mechanism and a product register mechanism movable relative to each other, quotient register mechanism, actuating mechanism, tens transfer mechanism, and overdraft responsive means adjacent the highest order of said actuating mechanism, division control mechanism and division programming mechanism actuated in response to an overdraft in the product register, aligning mechanism placed in operation by actuation of said division control mechanism and effective to disable said division mechanism and to produce a relative movement of said product register mechanism and said selection mechanism to an extreme right-hand position of said product register mechanism relative to said selection mechanism whenever the division operation established by actuation of said division control mechanism proceeds through a predetermined number of subtractive cycles without producing an overdraft in said product register and the product register contains no significant digit and intervening zero to the left of the ordinal location of the overdraft responsive means, and means operated by said overdraft responsive means for disabling said aligning mechanism.

12. In a calculating machine having key-operated selection mechanism, a product register longitudinally shiftable to the right and left relative to said selection mechanism, a quotient register effective to count the operating cycles of the machine, actuating mechanism, register shifting mechanism driven by said actuating mechanism and selectively controlled to effect a left-hand or a right-hand shift of said register, means controlling the additive or subtractive entry of values from said selection mechanism into said product register, overdraft responsive means adjacent the highest order of said actuating mechanism, division control means effective to establish a repetitive subtraction operation of the machine, and division programming mechanism effective in response to an overdraft in said product register to establish an operating program including at least one additive cycle and a shift of the carriage one ordinal space to the left followed by a resumption of divisional operation of the machine, a division aligning means driven by said actuating mechanism and effective only in the event of ten consecutive subtractive cycles of the machine without producing an overdraft in said product register when said product register is clear of any significant digit to the left of a zero in the order of said product register in registry with said overdraft responsive means to terminate the divisional operation, actuate said shifting mechanism to shift said product register to its extreme right-hand position relative to said selection mechanism and then effect a resumption of the divisional operation of the machine to produce an overdraft in said product register and bring said division programming mechanism into operation, the ten subtractive cycles required to effect operation of said division aligning mechanism being retained in said quotient register and the dividend in said product register being reduced by the ten subtractions of the divisor in said selection mechanism therefrom.

13. In a calculating machine having an ordinally arranged selection mechanism, an ordinally arranged product register longitudinally shiftable in either direction relative to said selection mechanism, a quotient register effective to count the operating cycles of the machine, register shifting mechanism, a cyclically operable actuating mechanism operable additively or subtractively, an overdraft sensing means in said product register, and a division mechanism for dividing a dividend in said product register by a divisor in said selection mechanism by the method of repeated subtraction of the divisor from the dividend in successive ordinal series of operations, a division aligning mechanism comprising means driven synchronously with the cycles of operation of said actuating mechanism and effective only in the event of ten consecutive subtractive cycles of the machine without operation of the overdraft sensing means to terminate the divisional operation, and actuate said shifting mechanism to shift said product register to a predetermined ordinal position.

14. In a calculating machine having an ordinally arranged selection mechanism, an ordinally arranged carriage longitudinally shiftable in either direction relative to said selection mechanism, a product register carried by said carriage, a quotient register effective to count the operating cycles of the machine, carriage shifting mechanism, actuating mechanism operable additively or substractively, an overdraft sensing means in said product register, and a division mechanism for dividing a dividend in said product register by a divisor in said selection mechanism by the method of repeated subtraction of the divisor from the dividend in successive ordinal series of operations, a division aligning mechanism comprising means effective only in the event of ten consecutive subtractive cycles of the machine without operation of the overdraft sensing means in the original register position to terminate the subtractive operation, actuate said carriage shifting mechanism to shift said carriage to a predetermined right-hand position relative to said selection mechanism and then effect a resumption of the subtractive operation of the machine and means operated by said overdraft sensing means to disable said aligning mechanism.

15. In a calculating machine having selection mechanism and product register mechanism movable relative to each other, quotient register mechanism, actuating mechanism, division mechanism for dividing a dividend in the product register by a divisor in the selection mechanism by the method of repeated subtraction of the divisor from the dividend in successive ordinal series of operations and division programming mechanism actuated in response to an overdraft in the product register, a mechanism placed in operation by actuation of said division mechanism and driven by said actuating mechanism for counting the number of operations in the first ordinal series of subtractive operations, means operated by said counting mechanism after counting ten such subtractive operations without the creation of an overdraft in the product register mechanism to effect a relative movement of said product register mechanism and said selection mechanism to an extreme right-hand position of said product register mechanism relative to said selection mechanism, and means operated by an overdraft in the product register during such first ordinal series for disabling the said counting mechanism.

16. In a calculating machine having selection mechaism and product register mechanism movable relative to each other, means for shifting one of said mechanisms relative to the other in either direction, quotient register mechanism, actuating mechanism, division control mechanism for dividing a dividend in the product register by a divisor in the selection mechanism by the method of repeated subtraction of the divisor from the dividend in successive ordinal series of operations, means for sensing an overdraft in the product register, mechanism placed in operation by actuation of said division control mechanism for counting the number of operations in the first ordinal series of operations, means operated by said counting means after counting ten such operations without creating an overdraft in the product register mechanism for operating said shifting means to produce a relative movement of said product register mechanism and said selection mechanism to a predetermined right-hand position of said product register mechanism relative to said selection mechanism, and means operated by the overdraft sensing means for disabling the said counting means, whereby a division operation is interrupted and the shifting means shifts the one mechanism to the predetermined position if the dividend is misaligned to the left of the divisor, but not otherwise.

References Cited in the file of this patent

UNITED STATES PATENTS

| 2,572,922 | Gang | Oct. 30, 1951 |
| 2,653,764 | Hopkins | Sept. 29, 1953 |
| 2,653,765 | Machado et al. | Sept. 29, 1953 |